(12) United States Patent
Suk et al.

(10) Patent No.: US 12,409,945 B2
(45) Date of Patent: Sep. 9, 2025

(54) FLUID ACCELERATOR

(71) Applicant: ESS 2 Tech, LLC, Bethlehem, PA (US)

(72) Inventors: Michael Suk, Milton, PA (US); David A. Shoffler, Marion Heights, PA (US)

(73) Assignee: ESS 2 Tech, LLC, Bethlehem, PA (US)

( * ) Notice: Subject to any disclaimer, the term of this patent is extended or adjusted under 35 U.S.C. 154(b) by 27 days.

(21) Appl. No.: 18/173,760

(22) Filed: Feb. 23, 2023

(65) Prior Publication Data

US 2024/0286757 A1    Aug. 29, 2024

(51) Int. Cl.
*B64D 41/00* (2006.01)
*F01D 5/02* (2006.01)
(Continued)

(52) U.S. Cl.
CPC ........... *B64D 41/007* (2013.01); *F01D 5/022* (2013.01); *F01D 5/141* (2013.01); *F01D 25/24* (2013.01);
(Continued)

(58) Field of Classification Search
CPC .......... Y02T 50/60; F02C 3/073; F02C 3/045; F02C 3/10; F01D 5/022; F01D 5/141; F01D 5/146; F01D 5/147; F01D 5/145; F01D 5/34; F01D 5/048; F01D 25/24; F04D 19/022; F04D 29/281; F04D 29/321; F04D 29/384; F04D 25/045; F04D 1/08; F04D 29/284; F04D 29/326; F05D 2220/36; F05D 2240/124; F05D 2240/14; F05D 2240/301; F05D 2240/306; F05D 2240/20;
(Continued)

(56) References Cited

U.S. PATENT DOCUMENTS 1,076,654 A    10/1913   Kuhlmann
1,263,473 A     4/1918   Schellens
(Continued)

FOREIGN PATENT DOCUMENTS

AU          676782       3/1997
CN        102022258      4/2011
(Continued)

OTHER PUBLICATIONS

Office Action mailed Jan. 16, 2020 in U.S. Appl. No. 16/969,347.
(Continued)

*Primary Examiner* — Eric J Zamora Alvarez
(74) *Attorney, Agent, or Firm* — Plumsea Law Group, LLC

(57) ABSTRACT

A turbine wheel may include an inner hub having a central axis, an outer ring concentric with the inner hub, and an intermediate ring concentrically disposed between the inner hub and the outer ring, and a plurality of turbine blades extending between the intermediate ring and the outer ring. The turbine blades may be oriented to be driven by a fluid stream flowing through the turbine wheel to rotate the turbine wheel in a first direction about the central axis. In addition, the turbine wheel may further include a plurality of compressor blades extending between the inner hub and the intermediate ring. Also, the compressor blades may be oriented to propel a fluid in a downstream direction when the turbine wheel is rotated in the first direction.

20 Claims, 18 Drawing Sheets

(51) Int. Cl.
- *F01D 5/04* (2006.01)
- *F01D 5/14* (2006.01)
- *F01D 25/24* (2006.01)

(52) U.S. Cl.
CPC .... *F05D 2240/14* (2013.01); *F05D 2240/301* (2013.01)

(58) Field of Classification Search
CPC . F05D 2220/34; B64D 41/007; B64C 11/001; B64C 3/14
See application file for complete search history.

(56) References Cited

U.S. PATENT DOCUMENTS

| | | |
|---|---|---|
| 1,361,277 A | 12/1920 | Mott |
| 2,169,232 A | 8/1939 | Flanders |
| 2,398,113 A | 4/1946 | Parrish |
| 2,592,227 A | 4/1952 | Clifton |
| 3,000,401 A | 9/1961 | Ringleb |
| 3,037,742 A | 6/1962 | Dent et al. |
| 3,070,284 A | 12/1962 | Kent |
| 3,076,510 A | 2/1963 | Piel |
| 3,494,539 A | 2/1970 | Littleford |
| 3,604,663 A | 9/1971 | Custer |
| 3,664,612 A | 5/1972 | Skidmore et al. |
| 3,750,689 A | 8/1973 | Britt |
| 3,807,663 A | 4/1974 | Bartoe |
| 3,830,450 A | 8/1974 | Williams |
| 3,908,683 A | 9/1975 | Demetrick |
| 3,929,369 A | 12/1975 | Blair |
| 3,937,238 A | 2/1976 | Stewart et al. |
| 3,999,797 A | 12/1976 | Kirsch |
| 4,021,135 A | 5/1977 | Pedersen et al. |
| 4,236,866 A | 12/1980 | Zapata |
| 4,240,250 A | 12/1980 | Harris |
| 4,318,565 A | 3/1982 | Lay |
| 4,434,957 A | 3/1984 | Moritz |
| 4,565,491 A | 1/1986 | Ivanov et al. |
| 4,603,898 A | 8/1986 | Udagawa |
| 4,611,796 A | 9/1986 | Orr |
| 4,674,788 A | 6/1987 | Ohmura |
| 4,772,062 A | 9/1988 | Janssen |
| 4,822,249 A | 4/1989 | Eckardt et al. |
| 4,975,023 A | 12/1990 | Miura et al. |
| 5,106,147 A | 4/1992 | Okada |
| 5,316,443 A | 5/1994 | Smith |
| 5,324,092 A | 6/1994 | Burg |
| 5,356,195 A | 10/1994 | Kanda |
| 5,382,070 A | 1/1995 | Turner |
| 5,588,804 A | 12/1996 | Neely |
| 5,645,403 A | 7/1997 | Bogage |
| 5,988,980 A * | 11/1999 | Busbey ............... F01D 11/001 415/78 |
| 6,183,041 B1 | 2/2001 | Wilson |
| 6,210,116 B1 | 4/2001 | Kuczaj et al. |
| 6,430,917 B1 * | 8/2002 | Platts .................. F04D 29/284 60/39.43 |
| 6,454,535 B1 * | 9/2002 | Goshorn ............. F01D 5/022 416/234 |
| 6,494,673 B2 * | 12/2002 | Choy .................. F01D 1/16 415/55.1 |
| 6,534,608 B2 | 3/2003 | Peterson |
| 6,692,232 B1 | 2/2004 | Letourneau |
| 6,807,802 B2 * | 10/2004 | Platts .................. F01D 5/046 60/39.43 |
| 6,870,280 B2 | 3/2005 | Pechler |
| 7,329,965 B2 | 2/2008 | Roberts |
| 7,390,163 B2 | 6/2008 | Clauson |
| 7,435,051 B2 | 10/2008 | Obinelo et al. |
| 7,484,925 B2 * | 2/2009 | Carlson .............. F04D 29/384 416/244 R |
| 7,494,325 B2 | 2/2009 | Gustafson et al. |
| 7,695,242 B2 | 4/2010 | Fuller |
| 7,758,303 B1 * | 7/2010 | Wadia ................. F02K 3/077 415/77 |
| 8,091,951 B1 | 1/2012 | Fitzgerald |
| 8,118,560 B2 | 2/2012 | Takahashi et al. |
| 8,192,141 B1 * | 6/2012 | Dale .................. F04D 19/022 415/199.5 |
| 8,402,742 B2 | 3/2013 | Roberge et al. |
| 8,491,036 B2 | 7/2013 | Henderson et al. |
| 8,500,291 B2 | 8/2013 | Wulff et al. |
| 8,550,786 B2 | 10/2013 | Janiuk |
| 8,667,773 B2 | 3/2014 | Silkowski |
| 8,672,622 B2 | 3/2014 | Ohya et al. |
| 8,678,310 B2 | 3/2014 | Masoudipour |
| 8,684,447 B2 | 4/2014 | Henderson et al. |
| 8,733,954 B2 | 5/2014 | Wulff et al. |
| 8,783,757 B2 | 7/2014 | Henderson et al. |
| 8,789,365 B2 | 7/2014 | Maier |
| 8,790,079 B2 | 7/2014 | Tersmette et al. |
| 8,801,359 B2 | 8/2014 | Sherrer |
| 8,882,028 B2 | 11/2014 | Chase |
| 8,973,974 B2 | 3/2015 | Kunkel |
| 9,056,636 B2 | 6/2015 | Henderson et al. |
| 9,205,778 B2 | 12/2015 | Henderson et al. |
| 9,261,073 B2 | 2/2016 | Blake et al. |
| 9,410,430 B2 | 8/2016 | Haskin |
| 9,428,228 B2 | 8/2016 | Henderson et al. |
| 9,534,608 B2 | 1/2017 | Gehlot et al. |
| 9,616,945 B1 | 4/2017 | Henderson et al. |
| 9,670,783 B2 | 6/2017 | Huebner et al. |
| 9,670,840 B2 * | 6/2017 | Plante ................. F02C 3/145 |
| 9,682,735 B2 | 6/2017 | Bacon |
| 9,695,799 B2 | 7/2017 | Aihara |
| 9,803,649 B2 | 10/2017 | Ragg et al. |
| 9,932,959 B2 | 4/2018 | Al-Shibl |
| 9,957,000 B2 | 5/2018 | Ehirim |
| 9,957,060 B2 | 5/2018 | Riordan |
| 10,030,520 B2 | 7/2018 | Duchene |
| 10,059,385 B1 | 8/2018 | Henderson et al. |
| 10,173,784 B2 | 1/2019 | Stewart |
| 10,415,543 B2 | 9/2019 | Nemoto |
| 10,619,483 B2 * | 4/2020 | Voytovych ............. F01D 5/34 |
| 10,766,544 B2 | 9/2020 | Suk |
| 11,040,745 B2 | 6/2021 | Chen |
| 11,060,406 B2 * | 7/2021 | Zeinalov .............. F01D 5/141 |
| 11,155,343 B2 | 10/2021 | Jasklowski |
| 11,390,333 B2 | 7/2022 | Suk |
| 11,673,617 B2 | 6/2023 | Suk |
| 2003/0071485 A1 | 4/2003 | Kazama |
| 2006/0169847 A1 | 8/2006 | Konings |
| 2006/0232102 A1 | 10/2006 | Steel |
| 2006/0233647 A1 | 10/2006 | Saunders |
| 2007/0012026 A1 | 1/2007 | Dev |
| 2007/0022738 A1 * | 2/2007 | Norris .................. F02K 3/068 60/39.43 |
| 2007/0224029 A1 | 9/2007 | Yokoi |
| 2008/0093886 A1 | 4/2008 | Nusbaum |
| 2008/0124211 A1 * | 5/2008 | Suciu .................. F02C 3/08 416/189 |
| 2009/0167030 A1 | 7/2009 | Watkins |
| 2009/0169386 A1 | 7/2009 | Suciu et al. |
| 2009/0246027 A1 | 10/2009 | Johnson |
| 2011/0033280 A1 | 2/2011 | Justak |
| 2011/0057452 A1 | 3/2011 | Interlandi |
| 2011/0181072 A1 | 7/2011 | Kempster |
| 2013/0048780 A1 | 2/2013 | Masoudipour |
| 2013/0076064 A1 | 3/2013 | Smith |
| 2013/0106136 A1 | 5/2013 | Smith |
| 2014/0290259 A1 * | 10/2014 | Plante ................. F02C 7/264 60/39.35 |
| 2015/0008699 A1 | 1/2015 | Yamaguchi |
| 2015/0158439 A1 | 6/2015 | Zha |
| 2015/0353149 A1 | 12/2015 | Wolf |
| 2016/0016616 A1 | 1/2016 | Bacon |
| 2016/0016618 A1 | 1/2016 | Wolf |
| 2016/0031496 A1 | 2/2016 | Zha |
| 2016/0258442 A1 | 9/2016 | Helton et al. |
| 2016/0273372 A1 | 9/2016 | Podgorski et al. |
| 2016/0298646 A1 | 10/2016 | Subramaniyan |
| 2017/0080770 A1 | 3/2017 | Irwin |

(56) References Cited

U.S. PATENT DOCUMENTS

| | | |
|---|---|---|
| 2017/0167275 A1 | 6/2017 | Schroeder et al. |
| 2017/0334491 A1 | 11/2017 | Dieckmann |
| 2018/0022403 A1 | 1/2018 | Fahland |
| 2018/0093714 A1 | 4/2018 | Chen |
| 2018/0093741 A1 | 4/2018 | Chen |
| 2018/0134331 A1 | 5/2018 | Yoon |
| 2018/0312203 A1 | 11/2018 | Smith |
| 2019/0084629 A1 | 3/2019 | Prince |
| 2019/0093629 A1 | 3/2019 | Juarez |
| 2019/0202503 A1* | 7/2019 | Suk .................. F01D 5/145 |
| 2020/0207426 A1 | 7/2020 | Motter |
| 2020/0270995 A1 | 8/2020 | Maar |
| 2020/0377158 A1 | 12/2020 | Cunningham |
| 2020/0398908 A1 | 12/2020 | Suk |
| 2020/0406988 A1 | 12/2020 | Bradley |
| 2021/0001929 A1 | 1/2021 | Baxter |
| 2021/0139084 A1 | 5/2021 | Pan |
| 2021/0403100 A1 | 12/2021 | Hussein |
| 2023/0399063 A1 | 12/2023 | Sostaric |

FOREIGN PATENT DOCUMENTS

| | | |
|---|---|---|
| CN | 105480311 | 4/2016 |
| CN | 105934333 | 9/2016 |
| CN | 106050335 | 10/2016 |
| CN | 106704259 | 5/2017 |
| CN | 107013248 | 8/2017 |
| CN | 114893342 | 8/2022 |
| DE | 322283 C | 6/1920 |
| DE | 102013101296 A1 | 8/2014 |
| DE | 102013105843 A1 | 12/2014 |
| DE | 102013217110 A1 | 3/2015 |
| DE | 102019000358 A1 | 7/2020 |
| EP | 76706 | 4/1983 |
| EP | 257341 A2 | 3/1988 |
| GB | 2608481 A | 1/2023 |
| JP | H03286189 | 12/1991 |
| JP | 05338562 | 11/2013 |
| KR | 101783194 | 10/2017 |
| WO | WO 2017156135 | 9/2017 |

OTHER PUBLICATIONS

Office Action mailed Dec. 6, 2021 in U.S. Appl. No. 17/008,846.
Office Action mailed Oct. 21, 2022 in U.S. Appl. No. 17/841,945.
Office Action mailed Dec. 13, 2023 in U.S. Appl. No. 18/321,448.
International Search Report and Written Opinion issued May 8, 2019 for Application No. PCT/US2018/67639.
Office Action dated Jan. 19, 2022 in Chinese Application No. 2018800900887.
Office Action dated Jul. 22, 2022 in Chinese Application No. 2018800900887.
Extended European Search Report dated Dec. 23, 2021 in European Application No. 18894327.8.
Extended European Search Report dated Jan. 19, 2024 in European Application No. 23203726.7.
Office Action dated Nov. 23, 2021 in Korean Application No. 10-2020-7021710.
Office Action dated Oct. 13, 2022 in Korean Application No. 10-2022-7028792.
Office Action mailed Jan. 3, 2024 in U.S. Appl. No. 18/173,748.
Office Action mailed Jul. 5, 2024 in U.S. Appl. No. 18/173,748.
Office Action mailed Nov. 21, 2024 in U.S. Appl. No. 18/173,748.
International Search Report and Written Opinion dated Apr. 5, 2024 in PCT application No. PCT/US2024/016806.
International Search Report and Written Opinion dated Jun. 18, 2024 in PCT application No. PCT/US2024/016809.
International Search Report and Written Opinion dated Jun. 17, 2024 in PCT application No. PCT/US2024/016812.
Office Action mailed Sep. 3, 2024 in U.S. Appl. No. 18/173,760.
Office Action mailed Feb. 12, 2025 in U.S. Appl. No. 18/173,759.
Office Action mailed Apr. 3, 2025 in U.S. Appl. No. 18/363,954.

* cited by examiner

FLUID ACCELERATOR

BACKGROUND OF THE INVENTION

The present invention relates generally to a fluid accelerator and, more particularly, to a fluid accelerator including an airfoil-shaped annular ring, a converging nozzle, and a bi-directional turbine wheel.

Various fluid systems utilize the energy from flowing fluid. For example, wind turbines and ram air turbines convert energy from air streams into electrical and/or hydraulic power. In addition, other fluid systems produce thrust by applying energy to fluid streams to accelerate the fluid stream. For example, jet engines burn fuel to accelerate intake air in order to generate thrust. Both types of systems are limited in their efficiency and effectiveness by the speed of the fluid stream at the inlet side of the fluid system. It would be beneficial to accelerate the fluid stream at the inlet side of either type of system. However, most fluid accelerating devices require power to introduce energy to the fluid stream. For a system that is intended to extract energy from the fluid stream, efficiency is greatly reduced if power is required to accelerate the fluid stream prior to the inlet of the fluid system. Similarly, for systems that already use power to accelerate a fluid stream, adding a separate device that also, itself requires power, is not generally an efficient approach.

There is a need in the art for a system and method that addresses the shortcomings discussed above.

SUMMARY OF THE INVENTION

The present disclosure is directed to a fluid accelerator that is passive. The passive air accelerator greatly increases the efficiency and effectiveness of energy producing systems, such as a ram air turbine, and greatly increases the output and efficiency of energy consumption systems, such as a jet engine.

In one aspect, the present disclosure is directed to a fluid accelerator. The fluid accelerator may include an outer housing having an inlet end and an outlet end, the outer housing defining a converging nozzle proximate the inlet end. The fluid accelerator may also include an annular ring disposed proximate the inlet end of the outer housing within the converging nozzle, wherein the annular ring has an airfoil cross-sectional shape.

In another aspect, the present disclosure is directed to a fluid accelerator. The fluid accelerator may include an outer housing having an inlet end and an outlet end, the outer housing defining a nozzle proximate the inlet end; and an annular ring disposed proximate the inlet end of the outer housing within the nozzle. The annular ring may have an airfoil cross-sectional shape. In addition, the annular ring may have a leading edge, a trailing edge, a suction side, and a pressure side. The airfoil cross-sectional shape may include a base portion including a first surface associated with the pressure side and a second surface associated with the suction side; an overhang portion that extends over some of the base portion; and an elliptic portion connecting the base portion and the overhang portion adjacent the leading edge. The overhang portion may be curved toward the second surface of the base portion.

In another aspect, the present disclosure is directed to a fluid accelerator. The fluid accelerator may include an outer housing having an inlet end and an outlet end, the outer housing defining a nozzle proximate the inlet end; and an annular ring disposed proximate the inlet end of the outer housing within the nozzle. The annular ring may have an airfoil cross-sectional shape, and may have a suction side of the airfoil cross-sectional shape and a pressure side of the airfoil cross-sectional shape. The annular ring may be angled with the suction side of the airfoil cross-sectional shape being tilted downstream toward the outlet end and the pressure side of the airfoil cross-sectional shape being tilted upstream toward the inlet end.

In another aspect, the present disclosure is directed to a turbine wheel. The turbine wheel may include an inner hub having a central axis, an outer ring concentric with the inner hub, and an intermediate ring concentrically disposed between the inner hub and the outer ring. The turbine wheel may also include a plurality of turbine blades extending between the intermediate ring and the outer ring, the turbine blades being oriented to be driven by a fluid stream flowing through the turbine wheel to rotate the turbine wheel in a first direction about the central axis. In addition, the turbine wheel may include a plurality of compressor blades extending between the inner hub and the intermediate ring, the compressor blades being oriented to propel a fluid in a downstream direction when the turbine wheel is rotated in the first direction.

In another aspect, the present disclosure is directed to a turbine wheel. The turbine wheel may include a plurality of turbine blades oriented to be driven by a fluid stream flowing through the turbine wheel to rotate the turbine wheel in a first direction about the central axis. The turbine wheel may also include a plurality of compressor blades oriented to propel a fluid in a downstream direction when the turbine wheel is rotated in the first direction. The turbine blades and/or the compressor blades may have an airfoil cross-sectional shape. The airfoil cross-sectional shape may include a base portion including a first surface associated with the pressure side and a second surface associated with the suction side; an overhang portion that extends over some of the base portion; and an elliptic portion connecting the base portion and the overhang portion adjacent the leading edge. The overhang portion may be curved toward the second surface of the base portion.

In another aspect, the present disclosure is directed to a fluid accelerator. The fluid accelerator may include an outer housing having an inlet end and an outlet end, the outer housing defining a nozzle proximate the inlet end. In addition, the fluid accelerator may include an annular ring disposed proximate the inlet end of the outer housing within the nozzle, wherein the annular ring has an airfoil cross-sectional shape. Also, the fluid accelerator may include a turbine wheel disposed within the outer housing downstream from the annular ring. The turbine wheel may include an inner hub having a central axis, an outer ring concentric with the inner hub, and an intermediate ring concentrically disposed between the inner hub and the outer ring. The turbine wheel may also include a plurality of turbine blades extending between the intermediate ring and the outer ring, the turbine blades being oriented to be driven by a fluid stream through the turbine wheel to rotate the turbine wheel in a first direction about the central axis. In addition, the turbine wheel may include a plurality of compressor blades extending between the inner hub and the intermediate ring, the compressor blades being oriented to drive a fluid downstream when the turbine wheel is rotated in the first direction.

Other systems, methods, features, and advantages of the invention will be, or will become, apparent to one of ordinary skill in the art upon examination of the following figures and detailed description. It is intended that all such additional systems, methods, features, and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The present disclosure is directed to systems that implement airfoils having hooked cross-sectional shapes. The airfoils of the disclosed embodiments may implement one or more airfoil shapes described in Suk et al., U.S. Pat. No. 10,766,544, issued on Sep. 8, 2020, and entitled "Airfoils and Machines Incorporating Airfoils," the entire disclosure of which is incorporated herein by reference.

In addition, the present disclosure is directed to systems that are usable with an internally mounted ram air turbine system. Accordingly, the disclosed systems may be used with a ram air turbine system having one or more features described in Suk et al., U.S. patent application Ser. No. 18/173,748, filed on Feb. 23, 2023, and entitled "Ram Air Turbine," the entire disclosure of which is incorporated herein by reference.

As used herein, the term "airfoil" (or "aerofoil") is any structure with curved surfaces that produces an aerodynamic force when moved through a fluid. As used herein, the term "fluid" may refer to any Newtonian Fluid. In other embodiments, airfoils could be used with Non-Newtonian Fluids.

An airfoil may include an upper or suction surface against which fluid flows at a relatively high velocity with low static pressure. An airfoil may also include a lower or pressure surface that has a high static pressure relative to the suction surface. Alternatively, the suction and pressure surfaces could be referred to as suction and pressure sides. The airfoil also includes a leading edge defined as the point at the front of the airfoil with maximum curvature. The airfoil also includes a trailing edge defined as the point at the rear of the airfoil with minimum curvature. In addition, a chord line of the airfoil refers to a straight line between the leading and trailing edges. Also, a mean camber line is the locus of points midway between the upper and lower surfaces and may or may not correspond with the chord line depending on the shape of the airfoil.

As used herein, an airfoil has a chord length defined as the length of the airfoil's chord line. In addition, the airfoil has a thickness defined as the distance between the upper and lower surfaces along a line perpendicular to the mean camber line. The width of an airfoil is taken in a direction perpendicular to both the chord line and the thickness.

Throughout the specification and claims the term "radius of curvature" is used. The radius of curvature is the reciprocal of the curvature at a particular location on a curve or two-dimensional surface. For a curve, the radius of curvature equals the radius of the circular arc that best approximates the curve at that point. In particular, it should be noted that the larger the radius of curvature of a curve, the smaller the curvature (and vice versa).

Figure 1:
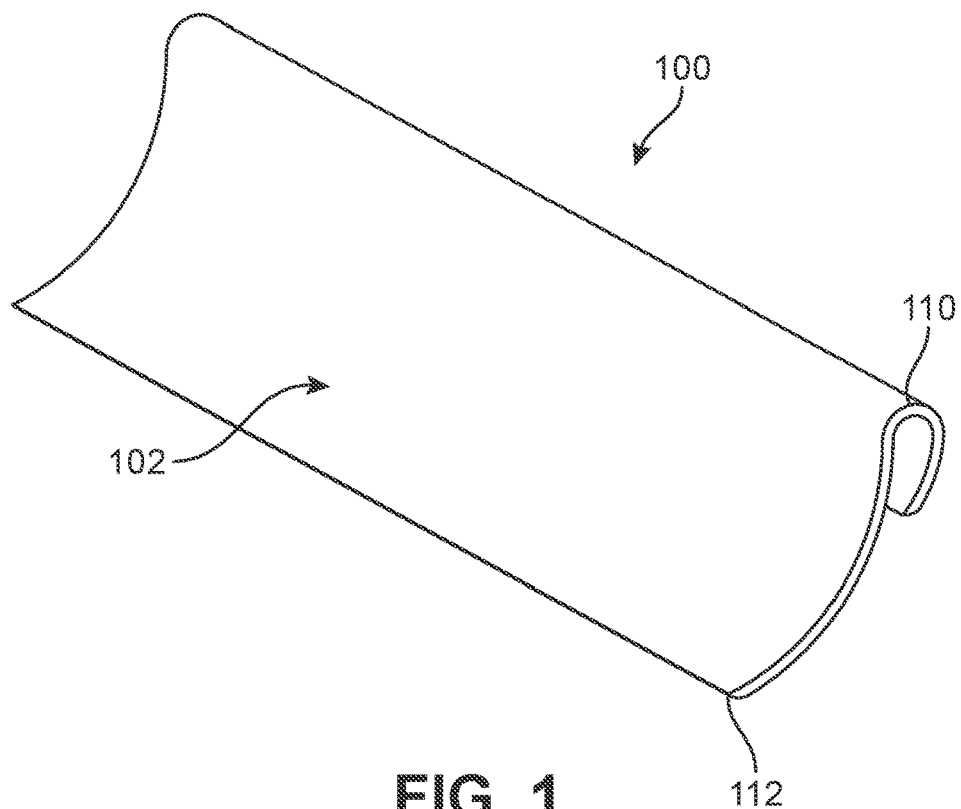
FIG. 1 is a schematic isometric view of an embodiment of an airfoil along the pressure side.
Figure 2:
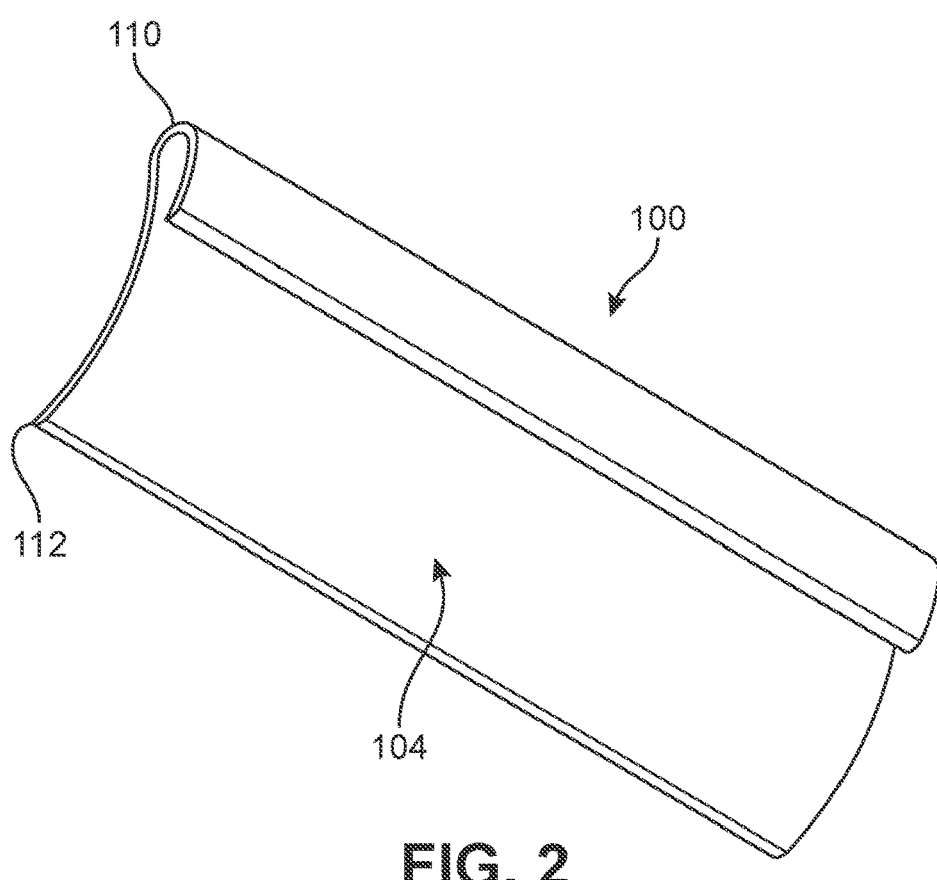
FIG. 2 is a schematic isometric view of a suction side of the airfoil of FIG. 1.
Figure 3:
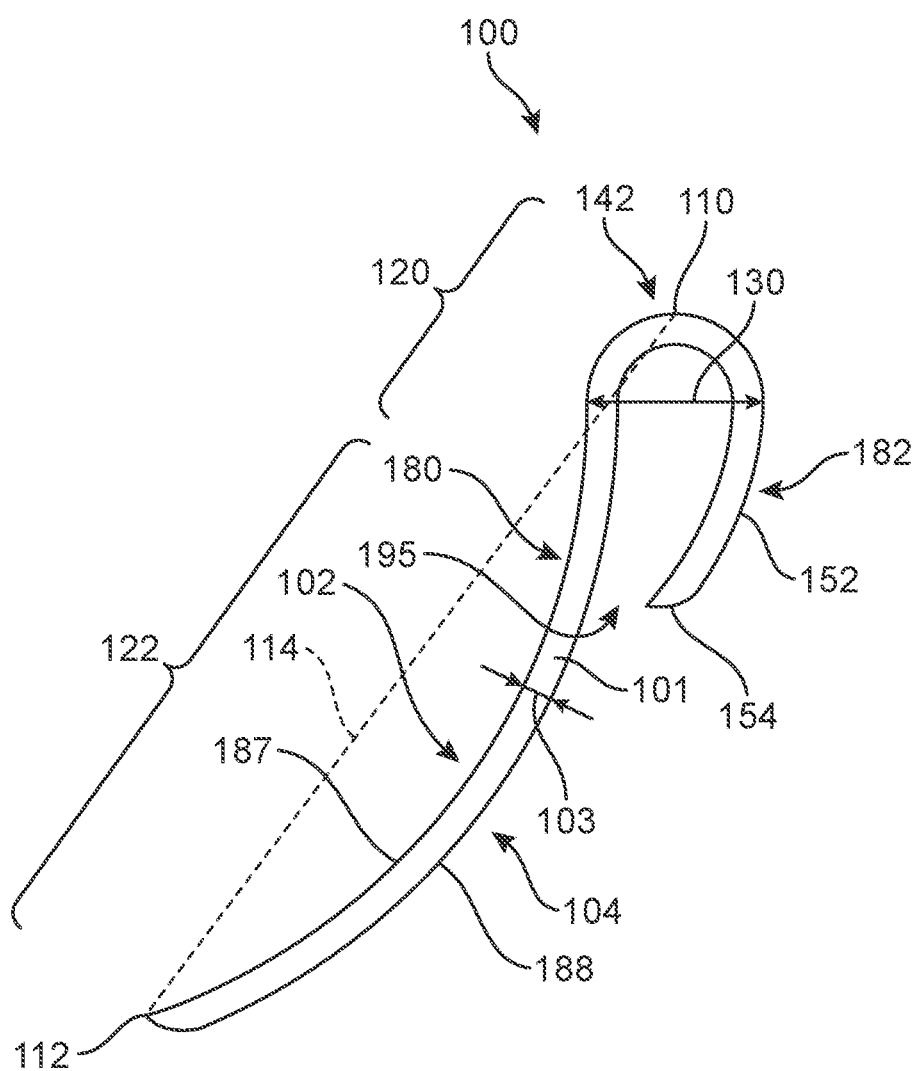
FIG. 3 is a schematic side view of an embodiment of an airfoil.

FIGS. 1-2 illustrate schematic isometric views of an airfoil (or blade) 100, while FIG. 3 illustrates a schematic side view of airfoil 100. Referring to FIGS. 1-3, airfoil 100 is comprised of a pressure side 102 (shown in FIG. 1) and an opposing suction side 104 (shown in FIG. 2). Each of these sides includes a surface (e.g., a pressure surface or a suction surface) in contact with air during operation. Additionally, airfoil 100 includes a leading edge 110 and a trailing edge 112. Moreover, leading edge 110 and trailing edge 112 are connected by a chord line 114 (see FIG. 3).

Referring to FIG. 3, in some embodiments, airfoil 100 may be comprised of a single body 101 of material. In some embodiments, airfoil 100 may be formed of a single unitary piece of material. Starting from trailing edge 112, body 101 includes a base portion 180 that is seen to curve gradually through the length of airfoil 100. Base portion 180 includes first a surface 187 on pressure side 102 of airfoil 100 and an opposing second surface 188 on opposing suction side 104.

At the end of base portion 180, body 101 bends to create a folded or hook-like section adjacent leading edge 110. That is, adjacent leading edge 110, body 101 is comprised of an elliptic portion 142 as well as an overhang portion 182 that hangs or extends over some of base portion 180. Elliptic portion 142 connects base portion 180 and overhang portion 182 and also includes leading edge 110.

In some embodiments, overhang portion 182 may be spaced apart or separated from base portion 180. In the embodiment of FIG. 3, overhang portion 182 is separated from base portion 180 by gap 195. In different embodiments, the size of gap 195 may vary. In some cases, gap 195 may be greater than or equal to a thickness of overhang portion 182. In some cases, gap 195 may be at least three times as large as a thickness of overhang portion 182. The size of gap 195, and thus, the spacing of overhang portion 182 from base portion 180, determines the airflow behavior across airfoil 100. Accordingly, as discussed in further detail below, gap 195 may be sized accordingly to provide the desirable airflow behavior.

The fold in body 101 adjacent leading edge 110 may be seen to divide airfoil 100 into two portions having distinctive geometries: a leading airfoil portion 120 and a trailing airfoil portion 122. As shown in FIG. 3, leading airfoil portion 120 is formed by the elliptic portion 142, the overhang portion 182, and the leading segment of base portion 180. Trailing airfoil portion 122 is formed by the trailing segment of base portion 180.

In different embodiments, the length of leading airfoil portion relative to the overall length of the airfoil (that is, the percent of the total airfoil length that the overhang portion extends over) can vary. In some cases, the leading airfoil portion has a relative length of 25 to 50 percent of the total airfoil length. In one embodiment, the leading airfoil portion has a length of at least 25 percent of the total airfoil length. In yet another embodiment, the leading airfoil portion has a length of at least one third of the total airfoil length. In some cases, the leading airfoil portion may made sufficiently long enough (at least 25 percent or so of the total airfoil length) so that the first arc portion can be gradually curved down towards the second arc portion, thereby helping to keep the boundary layer attached to the airfoil before the dramatic step down in thickness adjacent the second arc portion.

As seen in FIG. 3, body 101 has a relatively constant local thickness 103 throughout airfoil 100. However, the folded shape of body 101 that forms overhang portion 182 provides a greater overall thickness through leading airfoil portion 120 than in trailing airfoil portion 122. Here, the overall thickness is measured between opposing suction side 104 and pressure side 102 and is distinct from the local body thickness. Specifically, leading airfoil portion 120 has variable thickness 130 with a maximum value adjacent leading edge 110 and a minimum value at a location furthest from leading edge 110. In contrast, trailing airfoil portion 122 has an approximately constant thickness. In some embodiments, the thickness of trailing airfoil portion 122 is approximately equal to local thickness 103 of body 101. In other embodiments, trailing airfoil portion 122 could also have a variable thickness.

An airfoil may include provisions for keeping airflow "stuck" on the suction surface so that the air can be redirected through a large angle (e.g., from a near horizontal direction for incoming air to a near vertical direction for outgoing air). In some embodiments, an airfoil can include a leading airfoil portion that includes one or more arcs for controlling the flow of air along a suction surface.

In some embodiments, overhang portion 182 may be further comprised of a first arc portion 152 and a second arc portion 154. First arc portion 152 may extend from elliptic portion 142, while second arc portion 154 may be disposed at an open or free end of overhang portion 182. In some embodiments, the curvature (along opposing suction side 104) of overhang portion 182 may vary from first arc portion 152 to second arc portion 154. In some cases, first arc portion 152 may be configured to curve down in the direction of base portion 180. Moreover, second arc portion 154 may be configured with steeper curvature that is also directed downwardly toward base portion 180.

In the following description the radius of curvature of various surfaces is defined relative to the length of a unit radius, denoted as "UN." In different embodiments, the particular value of the length of the unit radius could vary. For example, the unit radius could have a length of 100 mm (i.e., 1 UN=100 mm), 6 inches (i.e., 1 UN=6 inches), or any other value. It may be understood that the ratio of two radii of curvature is independent of the particular value of the unit radius. Thus, if a first surface has a radius of curvature of 1 UN and a second surface has a radius of curvature of 0.5 UN, the ratio is equal to 1 divided by 0.5, or 2, and is a dimensionless quantity that is independent of the particular length of the unit radius in a given embodiment.

Figure 4:
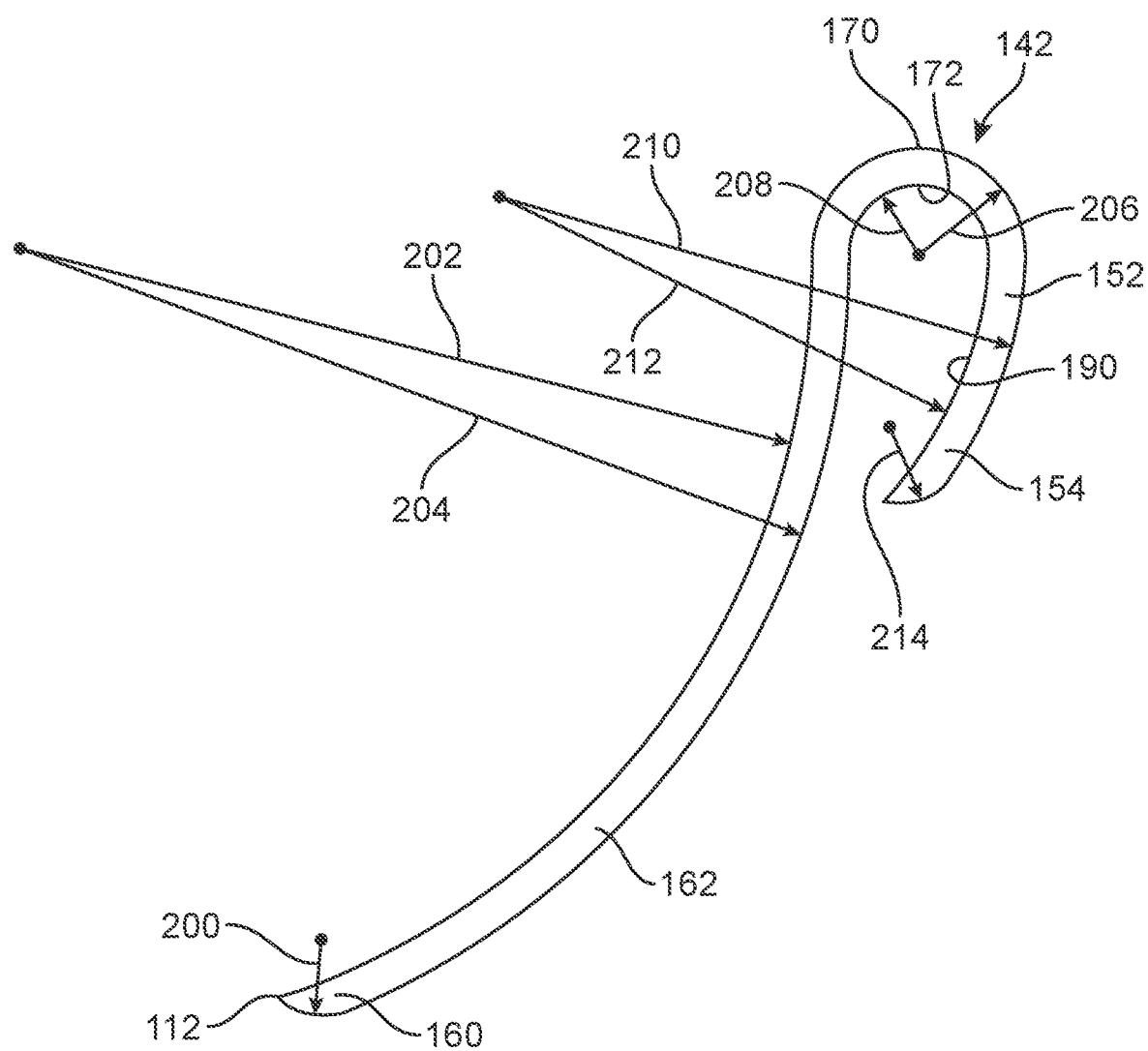
FIG. 4 is a schematic side view of the airfoil of FIG. 3, in which the curvature of various portions of the airfoil are indicated.

FIG. 4 is a schematic side view of airfoil 100. Referring to FIG. 4, the different portions or segments of airfoil 100 can have different degrees of curvature. In some embodiments, trailing airfoil portion 122 has trailing arc portion 160 immediately adjacent trailing edge 112. Trailing arc portion 160 has a radius of curvature 200. In some cases, radius of curvature 200 could have a value of approximately 0.1000 UN. In some embodiments, main segment 162 of trailing airfoil portion 122 has a radius of curvature 202 along pressure side 102 and a radius of curvature 204 along opposing suction side 104. In some cases, radius of curvature 202 has a value of approximately 1.1250 UN. In some cases, radius of curvature 204 has a value of approximately 1.1750 UN. In some embodiments, elliptic portion 142 has a radius of curvature 206 on outward facing side 170 and a radius of curvature 208 on inward facing side 172. In some cases, radius of curvature 206 has a value of approximately 0.1500 UN. In some cases, radius of curvature 208 has a value of approximately 0.1000 UN.

In some embodiments, first arc portion 152 has a radius of curvature 210 along opposing suction side 104 and a radius of curvature 212 along inward facing surface 190. In some cases, radius of curvature 210 has a value of approximately 0.7500 UN. In some cases, radius of curvature 212 has a value of approximately 0.7000 UN. In addition, second arc portion 154 has a radius of curvature 214. In some cases, radius of curvature 214 has a value of approximately 0.1000 UN.

In some embodiments, the curvature of each segment of airfoil 100 may be selected to help keep the boundary layer of flowing air attached to opposing suction side 104, even as airfoil 100 curves from leading edge 110 to trailing edge 112.

Figure 5:
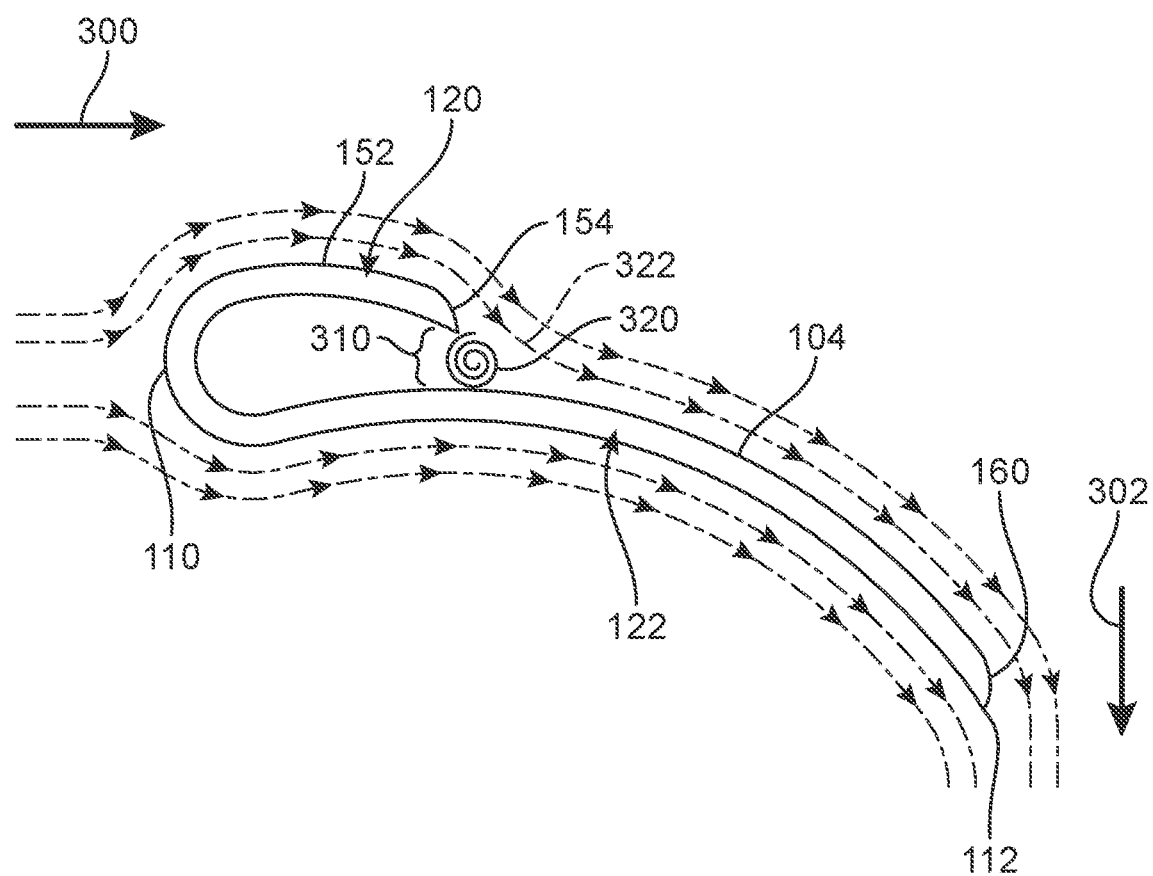
FIG. 5 is a schematic view of an embodiment of an airfoil indicating pathlines of airflow elements.

FIG. 5 is a schematic view of airfoil 100 in operation as air passes across it. Referring to FIG. 5, incoming air flows in a first direction 300 and encounters leading edge 110 first. Air moving across opposing suction side 104 will first pass across first arc portion 152, which curves to second arc portion 154. Air then gets directed into trailing airfoil portion 122. As the air flows along trailing airfoil portion 122, it is directed to trailing arc portion 160 and turns as it leaves trailing edge 112.

The geometry of leading airfoil portion 120 creates step-down region 310 resulting in an abrupt change in thickness between leading airfoil portion 120 and trailing airfoil portion 122. This sudden change in thickness (and geometry) creates vortex 320 (and/or turbulent eddies) at step-down region 310. As air flows over opposing suction side 104, vortex 320 "pulls" the air toward the airfoil and thereby reattaches the boundary layer of the flow as it moves from one section of the airfoil to the next, keeping the air "stuck" on opposing suction side 104.

The embodiments utilize specifically curved arc portions adjacent step-down region 310 to help actively control the turbulent eddies or vortices that develop at step-down region 310. Specifically, first arc portion 152 and second arc portion 154 combine to actively redirect the fluid flow with use of the Coandă effect toward reattachment to the airfoil surface. The Coandă effect refers to the tendency of a jet of fluid emerging from an orifice to follow an adjacent flat or curved surface and to entrain fluid from the surroundings so that a region of lower pressure develops. Vortex 320 (and/or turbulent eddies) at step-down region 310 creates a pressure difference between second arc portion 154 and trailing airfoil portion 122. The active fluid flowing across opposing suction side 104 creates an air curtain 322 (via the Coandă effect) that helps hold vortex 320 in place and keeps it attached to opposing suction side 104. Air curtain 322 thus provides a stabilizing force to keep vortex 320 in place, which further serves to prevent the boundary layer from delaminating from airfoil 100.

This arrangement provides an airfoil that keeps the airflow stuck to opposing suction side 104 enough to turn the airflow direction by close to 90 degrees. That is, air initially flowing in first direction 300 as it encounters leading edge 110 leaves trailing edge 112 traveling in a second direction 302. In some cases, second direction 302 may be approximately 90 degrees From first direction 300. Thus, the airfoil will be forced in a direction that is substantially opposite of first direction 302. When the airfoil is included in a rotational turbine blade set, this redirection of airflow, resulting in opposing forces that drive the airfoil in a direction that is substantially 90 degrees From the direction of air flow into which the airfoil is placed, may maximize the amount of rotational energy to which the airflow is converted. This may maximize the amount of electrical power that may be generated by such a turbine blade set. In other embodiments, depending on the shape and local curvature of various segments of airfoil 100, the direction of incoming air could be changed by any amount between approximately 10 and 90 degrees.

In different embodiments, the disclosed airfoils could be manufactured from various materials. Exemplary materials include, but are not limited to, materials known for use in manufacturing turbine blades (e.g., U-500, Rene 77, Rene N5, Rene N6, PWA1484, CMSX-4, CMSX-10, Inconel, GTD-111, EPM-102, Nominic 80a, Niminic 90, Nimonic 105, Nimonic 105 and Nimonic 263). Other materials include ceramic matrix composites. Other materials for airfoils can include, but are not limited to, aluminum, composite materials, steel, titanium as well as other materials.

Airfoils can be manufactured using any known methods. In some embodiments, an airfoil can be formed using an extrusion process.

The dimensions of an airfoil can vary according to its intended application. The chord line length, width, and thickness can all be varied in different ratios while maintaining the general profile shape of the airfoil.

A turbine blade set that implements blades having the airfoil shape described above may be utilized in a ram air turbine. Such a ram air turbine may be configured for use in an aircraft. In some embodiments, the ram air turbine may be fixedly housed inside the body shell of the aircraft. Conduits may direct air from the air stream around the aircraft into the body shell to the internal ram air turbine and back out of the body shell.

Figure 6:
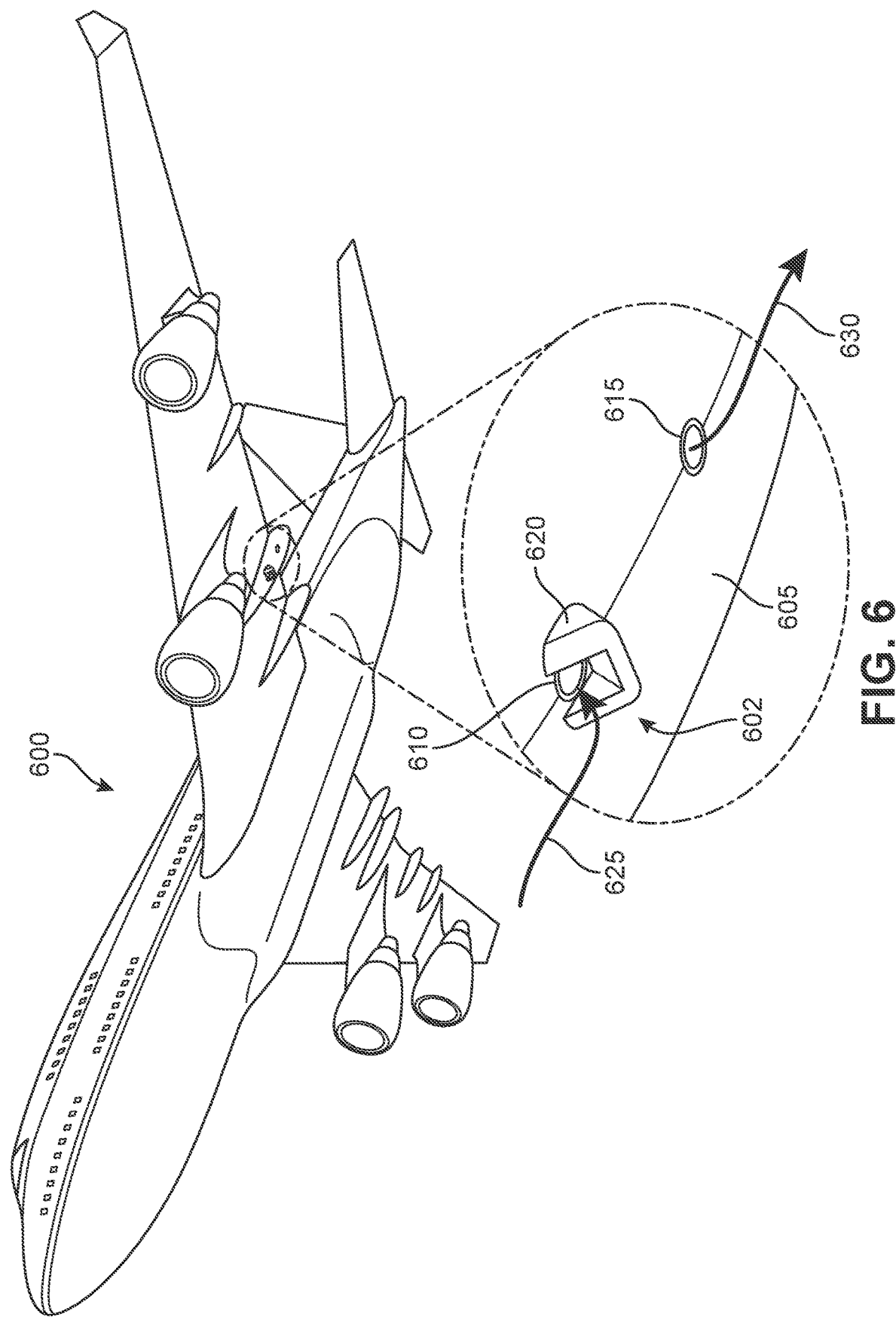
FIG. 6 is a schematic illustration of an aircraft with an enlarged view of externally exposed components of a ram air turbine system.

FIG. 6 is a schematic illustration of an aircraft with an enlarged view of externally exposed components of a ram air turbine system. As shown in FIG. 6, an aircraft 600 may include a ram air turbine system 602. Aircraft 600 may include a body shell 605. System 602 may be located at any suitable location of aircraft 600. For example, in some embodiments, system 602 may be located in the fuselage. In other embodiments, system 602 may be located on a wing. Further, in some embodiments, system 602 may be located in a flap track fairing, as shown in FIG. 6. Air flow adjacent the flap track fairing is typically smooth, and thus, desirable for placement of a ram air turbine system because it produces consistent power, which is favorable for producing stable amounts of hydraulic pressure. It will be understood, however, that other locations may be suitable for the disclosed ram air turbine system.

As shown in FIG. 6, system 602 may include an air inlet 610, into which air from the air stream outside of body shell 605 may flow, as indicated by an arrow 625. Air entering air inlet 610 may be directed to a ram air turbine located inside body shell 605 (see FIG. 7). Air inlet 610 may have any suitable shape to enable smooth flow of air to be delivered to the ram air turbine. Bevels, curves, and other shapes may be used for the surfaces in and around air inlet 610 to affect aerodynamics of the air flow delivered to the ram air turbine. The size of air inlet 610 may be suited to provide air flow to the ram air turbine with the volume, speed, and consistency desired for operation of the ram air turbine.

In some embodiments, additional airflow may be directed into air inlet 610 by an air scoop 620. In some embodiments air scoop 620 may be deployable. Accordingly, in an undeployed position (not shown), air scoop 620 may sit flush, or substantially flush, with the outer surface of body shell 605. In a deployed position, as shown in FIG. 6, air scoop 620 may collect and guide or direct air into air inlet 610. Air scoop 620 may include suitable features to provide air flow at a speed and consistency desired for operation of the ram air turbine. Air scoop 620 may be formed of any suitable material, such as carbon fiber, aluminum, titanium, steel, stainless steel, or any other material with the strength and rigidity to be deployed into the airstream around the aircraft on which it is implemented.

The deployment mechanism of air scoop 620 is not shown. It will be understood that any suitable deployment mechanism may be used for the deployment of air scoop 620, and that skilled artisans will appreciate mechanisms that are suitable for deploying an air scoop into an air stream at a given aircraft speed. Because of the simplicity of air scoop 620 compared to any ram air turbine, the deployment mechanism for air scoop 620 may have a reduced size, weight, and/or complexity compared to deployment mechanisms for ram air turbines.

In addition, as also shown in FIG. 6, body shell 605 may include an air outlet 615. Air exiting the ram air turbine within body shell 605 may be directed out of air outlet 615.

Accordingly, to facilitate the air flow through the ram air turbine, air inlet 610 and air outlet 615 may be arranged spaced from one another in the direction of aircraft flight. While the two ports need not necessarily be located directly in line with one another, the air flow through the ram air turbine is facilitated if air inlet 610 is positioned further forward toward the front of aircraft 600 and air outlet 615 is positioned further aft toward the rear of aircraft 600.

Although not shown in FIG. 6, in some embodiments, air outlet 615 may include a closure plate or other structure to close it off when the ram air turbine is not in use. In some cases, operation of the closure plate may be mechanically linked to the deployment of air scoop 620. Other mechanisms to effectuate the opening of the closure plate when needed may also be utilized, such as spring-bias, air pressure, etc.

Figure 7:
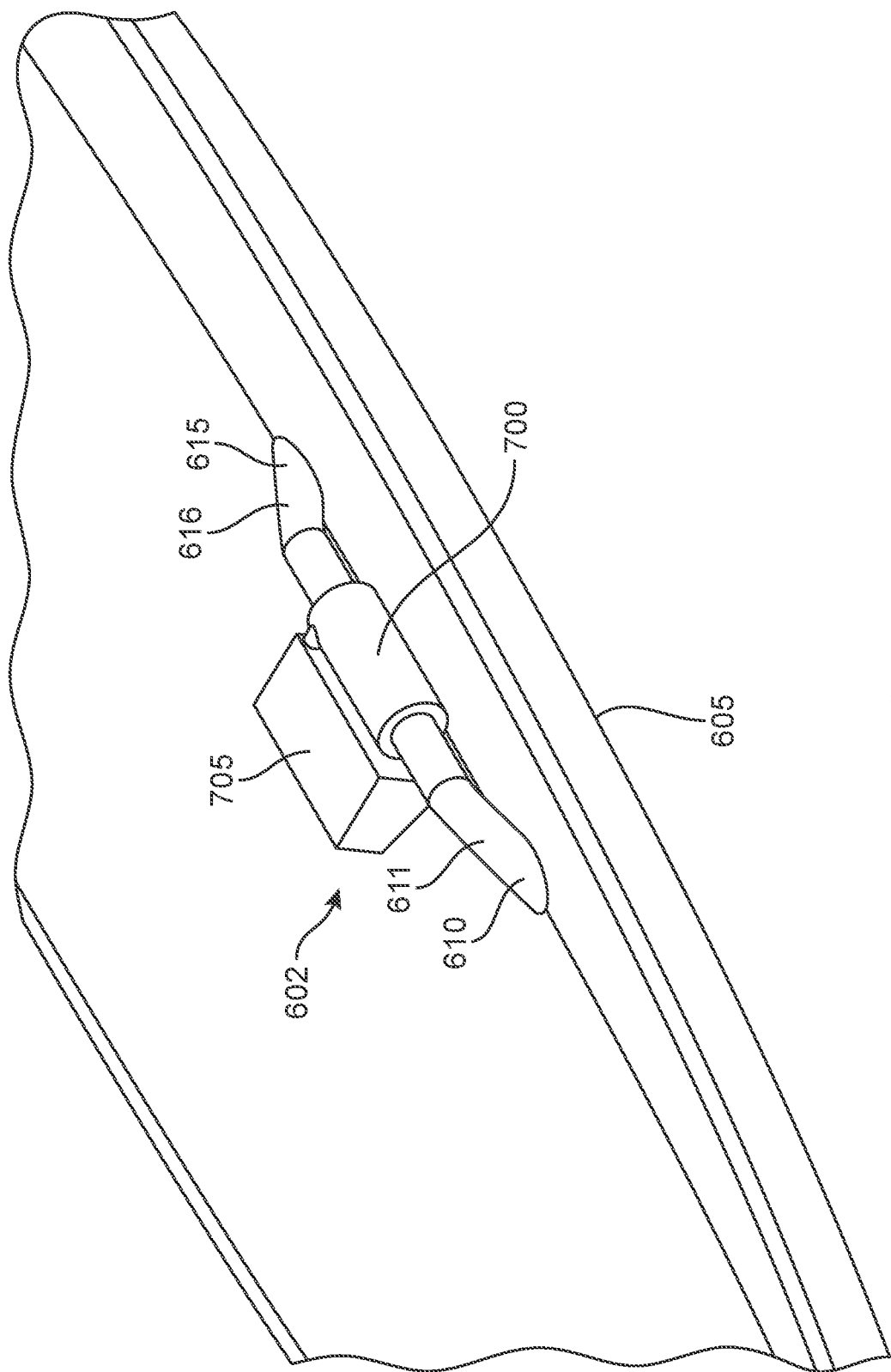
FIG. 7 is a schematic illustration of the inside of an aircraft body shell showing components of a ram air turbine system.

FIG. 7 is a schematic illustration of the inside of aircraft body shell 605 showing components of ram air turbine system 602. As shown in FIG. 7, system 602 may include an intake conduit 611 configured to guide air from air inlet 610 in body shell 605 to a ram air turbine, which may be housed in a ram air turbine housing 700. In addition, system 602 may include an outlet conduit 616 configured to guide air exiting the ram air turbine to air outlet 615 in body shell 605. The shape, size, and material with which air intake conduit 611 and outlet conduit 616 are formed may be selected accordingly to deliver air flow to the ram air turbine in the amount, speed, and smoothness desired.

Thus, in some embodiments, the ram air turbine may be fixedly housed inside body shell 605 of the aircraft. In addition, an electric generator may be associated with, and configured to be driven by, the ram air turbine. Accordingly, a generator housing 705 may be configured to fixedly house the generator inside body shell 605 of the aircraft.

By keeping the ram air turbine inside the aircraft, and only deploying an air scoop, not only may weight be saved because the deployment mechanism for the air scoop is lighter than that of a ram air turbine, but also the deployed air scoop may produce less drag than a ram air turbine that is, itself, deployed into the air stream.

Figure 8:
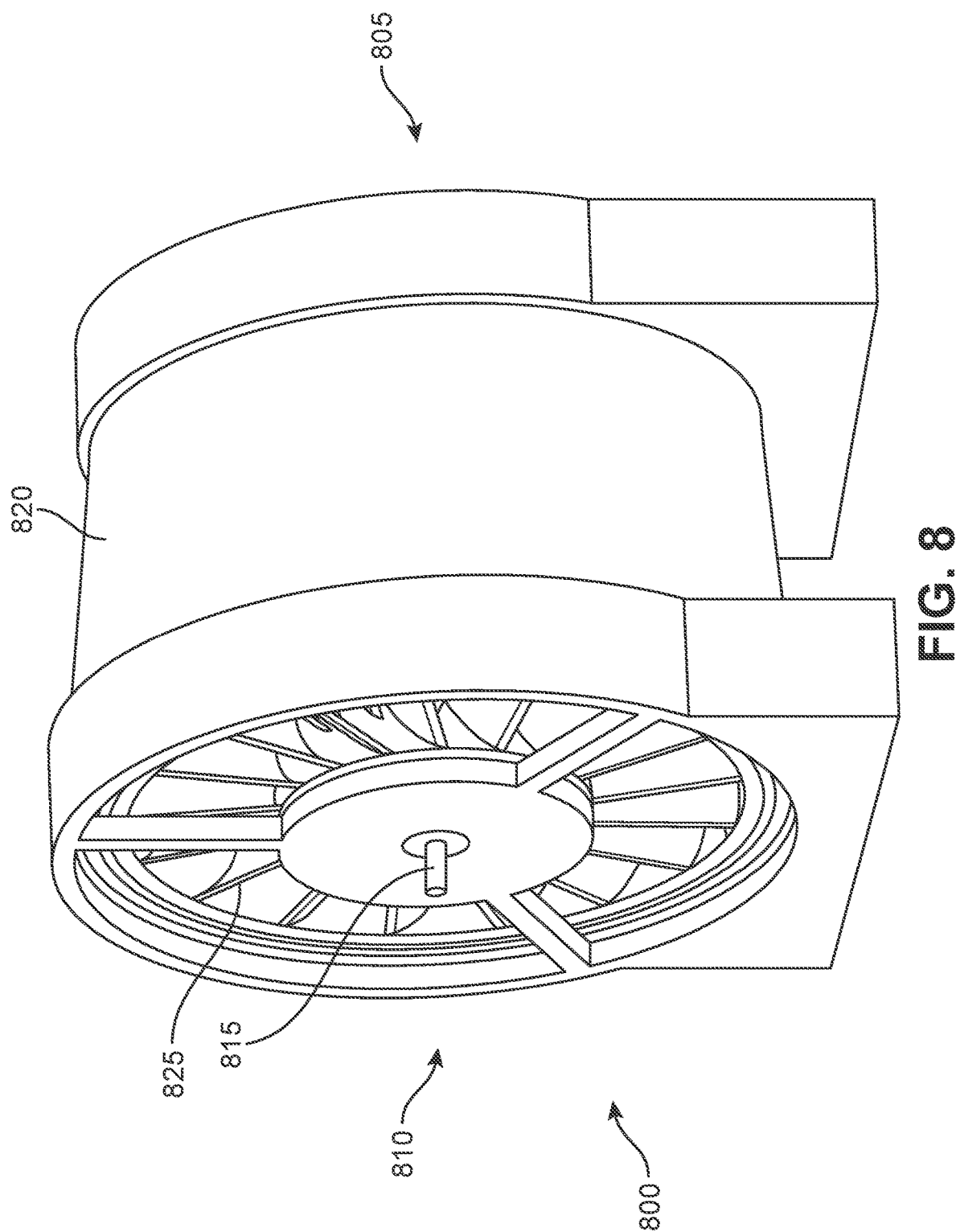
FIG. 8 is a schematic rear view of a ram air turbine according to an exemplary embodiment.

FIG. 8 is a schematic rear view of a ram air turbine 800 according to an exemplary embodiment. As shown in FIG. 8, ram air turbine 800 may have an upstream end 805 and a downstream end 810. Thus, ram air turbine 800 may be configured to receive air flowing through ram air turbine 800 from upstream end 805 to downstream end 810.

In addition, ram air turbine 800 may include an outer housing 820. In some embodiments, outer housing may be tapered. For example, as shown in FIG. 8, outer housing 820 may have a larger diameter at downstream end 810 than at upstream end 805.

FIG. 8 also shows an output shaft 815 configured to be driven by turbine blade sets 825 within outer housing 820. Output shaft 815 may ultimately drive an electric power generator, a hydraulic pump, or both.

Figure 9:
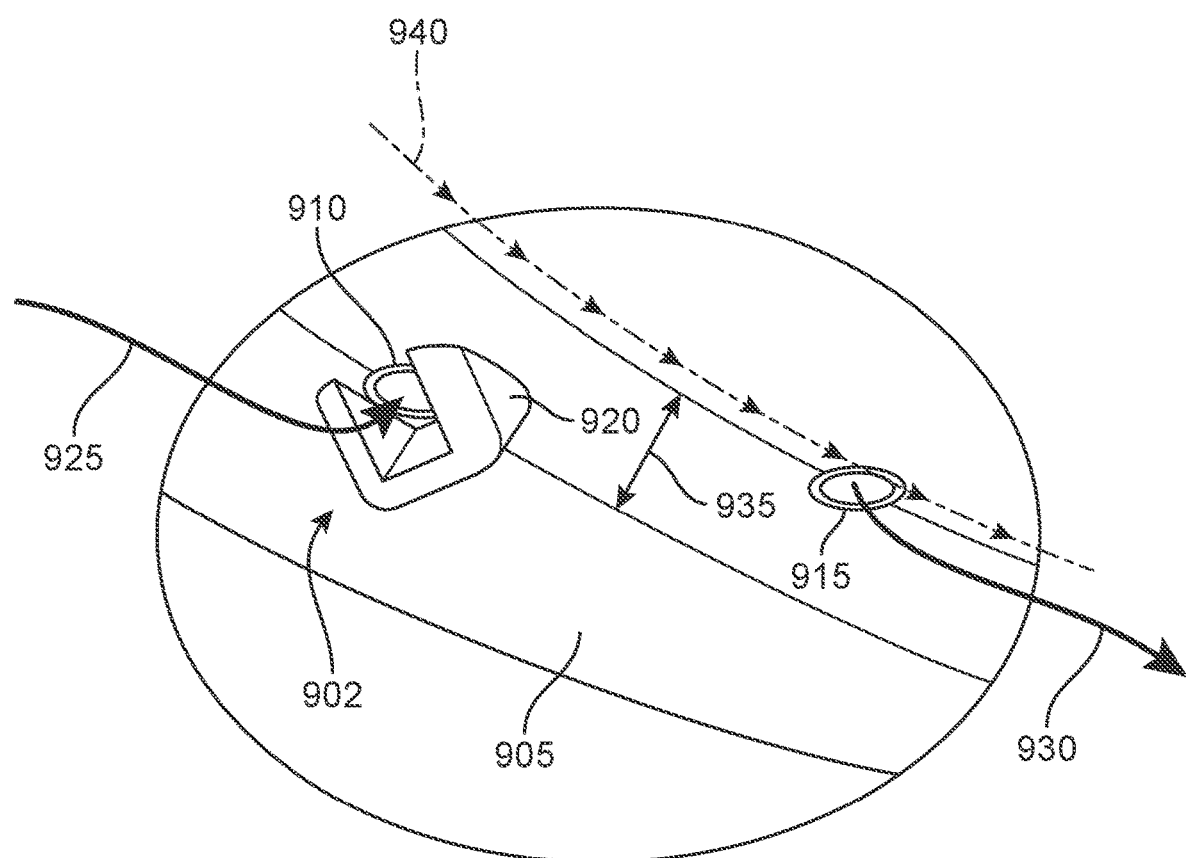
FIG. 9 is a schematic illustration of an aircraft with an enlarged view of externally exposed components of a ram air turbine system according to an alternative embodiment.

FIG. 9 is a schematic illustration of an aircraft with an enlarged view of externally exposed components of a ram air turbine system according to an alternative embodiment. As shown in FIG. 9, an aircraft may include a ram air turbine system 902. The aircraft may include a body shell 905. Like system 602, system 902 may be located at any suitable location of the aircraft.

As shown in FIG. 9, system 902 may include an air inlet 910, into which air from the air stream outside of body shell 905 may flow, as indicated by an arrow 925. Air entering air inlet 910 may be directed to a ram air turbine located inside body shell 905 (see FIG. 7). Additional airflow may be directed into air inlet 910 by an air scoop 920. In some embodiments air scoop 920 may be deployable. Accordingly, in an undeployed position (not shown), air scoop 920 may sit flush, or substantially flush, with the outer surface of body shell 905. In a deployed position, as shown in FIG. 9, air scoop 920 may collect and guide or direct air into air inlet 910. Air scoop 920 may include suitable features to provide air flow at a speed and consistency desired for operation of the ram air turbine. Air scoop 920 may be formed of any suitable material, such as carbon fiber, aluminum, titanium, steel, stainless steel, or any other material with the strength and rigidity to be deployed into the airstream around the aircraft on which it is implemented.

The deployment mechanism of air scoop 920 is not shown. It will be understood that any suitable deployment mechanism may be used for the deployment of air scoop 920, and that skilled artisans will appreciate mechanisms that are suitable for deploying an air scoop into an air stream at a given aircraft speed.

In addition, as also shown in FIG. 9, body shell 905 may include an air outlet 915. Air exiting the ram air turbine within body shell 905 may be directed out of air outlet 915. Accordingly, to facilitate the air flow through the ram air turbine, air inlet 910 and air outlet 915 may be arranged spaced from one another in the direction of aircraft flight. While the two ports need not necessarily be located directly in line with one another, the air flow through the ram air turbine is facilitated if air inlet 910 is positioned further forward toward the front of aircraft 900 and air outlet 915 is positioned further aft toward the rear of aircraft 900.

In addition to the air stream flowing into inlet 910 and through the RAT inside the aircraft body shell 905, airflow through the system is also driven by the venturi effect at outlet 915. While the venturi effect does drive the air flow through system 602, this effect may be tempered by the presence of air scoop 620 being aligned with outlet 615 in the direction of the air stream. In order to maximize the venturi effect, in some embodiments, the outlet may be located not only spaced in the direction of air flow, but also laterally. For example, as shown in FIG. 9, outlet 915 may be spaced laterally from inlet 910, as indicated by an arrow 935. Accordingly, a clean airstream flows over outlet 915, undisrupted by air scoop 920, as indicated by an arrow 940.

Figure 10:
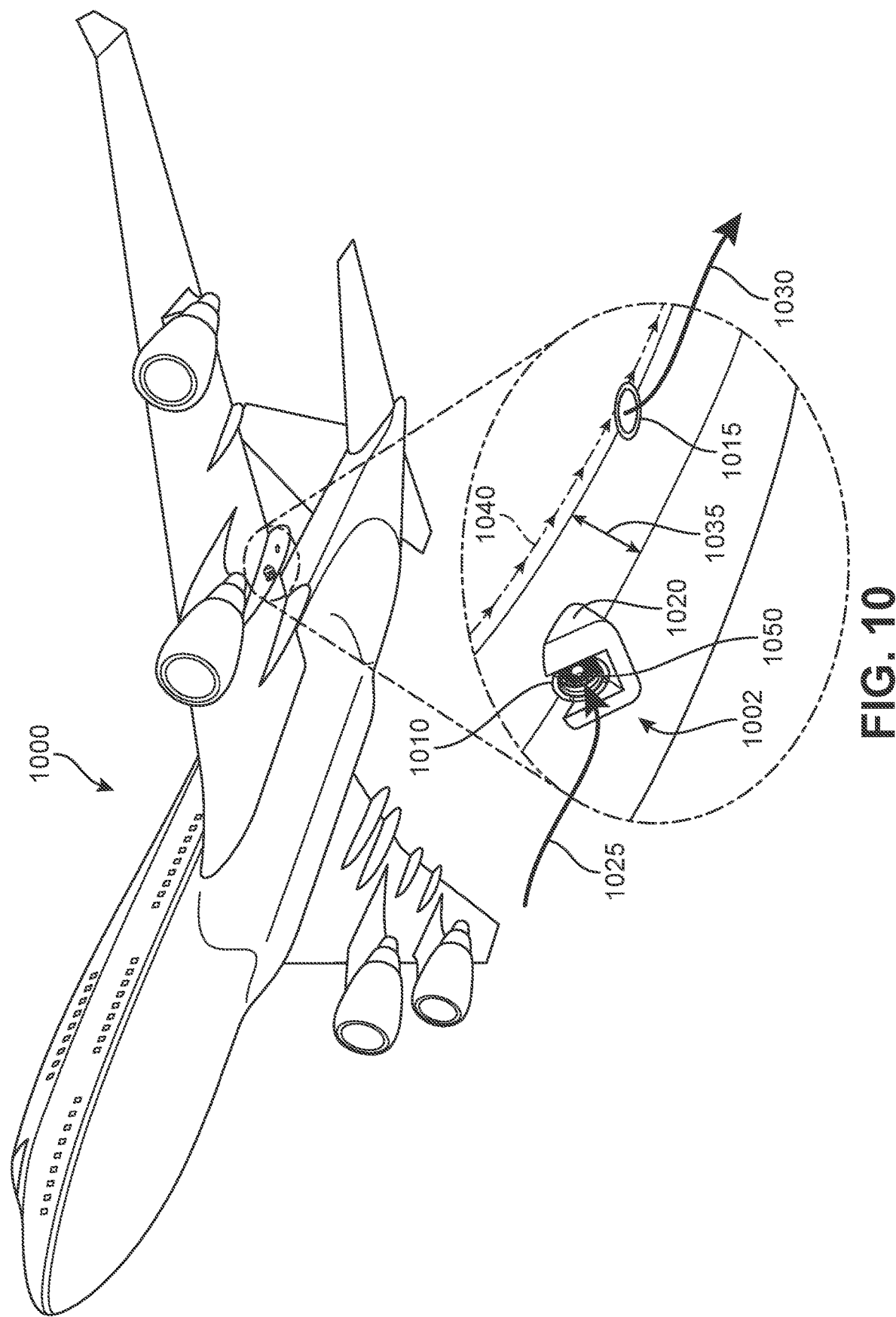
FIG. 10 is a schematic illustration of an aircraft with an enlarged view of externally exposed components of a ram air turbine system according to another alternative embodiment.

In some embodiments, the internal RAT system can also include a fluid accelerator at the inlet, to increase the speed of air delivered to the RAT. Since the accelerator discussed herein works in liquids as well as gases, it is referred to as a "fluid" accelerator. In air applications, such as an RAT, it may also be referred to as an "air" accelerator. FIG. 10 is a schematic illustration of an aircraft with an enlarged view of externally exposed components of a ram air turbine system according to another alternative embodiment. As shown in FIG. 10, an aircraft 1000 may include an internal ram air turbine system 1002. System 1002 may include an air inlet 1010 and an air outlet 1015. System 1002 may also include an air scoop 1020 configured to guide air into air inlet 1010, as indicated by arrow 1025, with air exiting air outlet 1015 being indicated by arrow 1030. As shown in FIG. 10, air outlet 1015 may be laterally spaced from air inlet 1010, as indicated by arrow 1035, so that an undisturbed airstream, indicated by arrow 1040, flows over air outlet 1015 to produce a venturi effect.

Other features of system 1002 may be the same or similar to system 602 and 902 discussed above. In addition, system 1002 may include a fluid accelerator 1050 disposed at inlet 1010. Any suitable fluid accelerator may be utilized with system 1002. Exemplary features of such a fluid accelerator are discussed below in greater detail.

Figure 11:
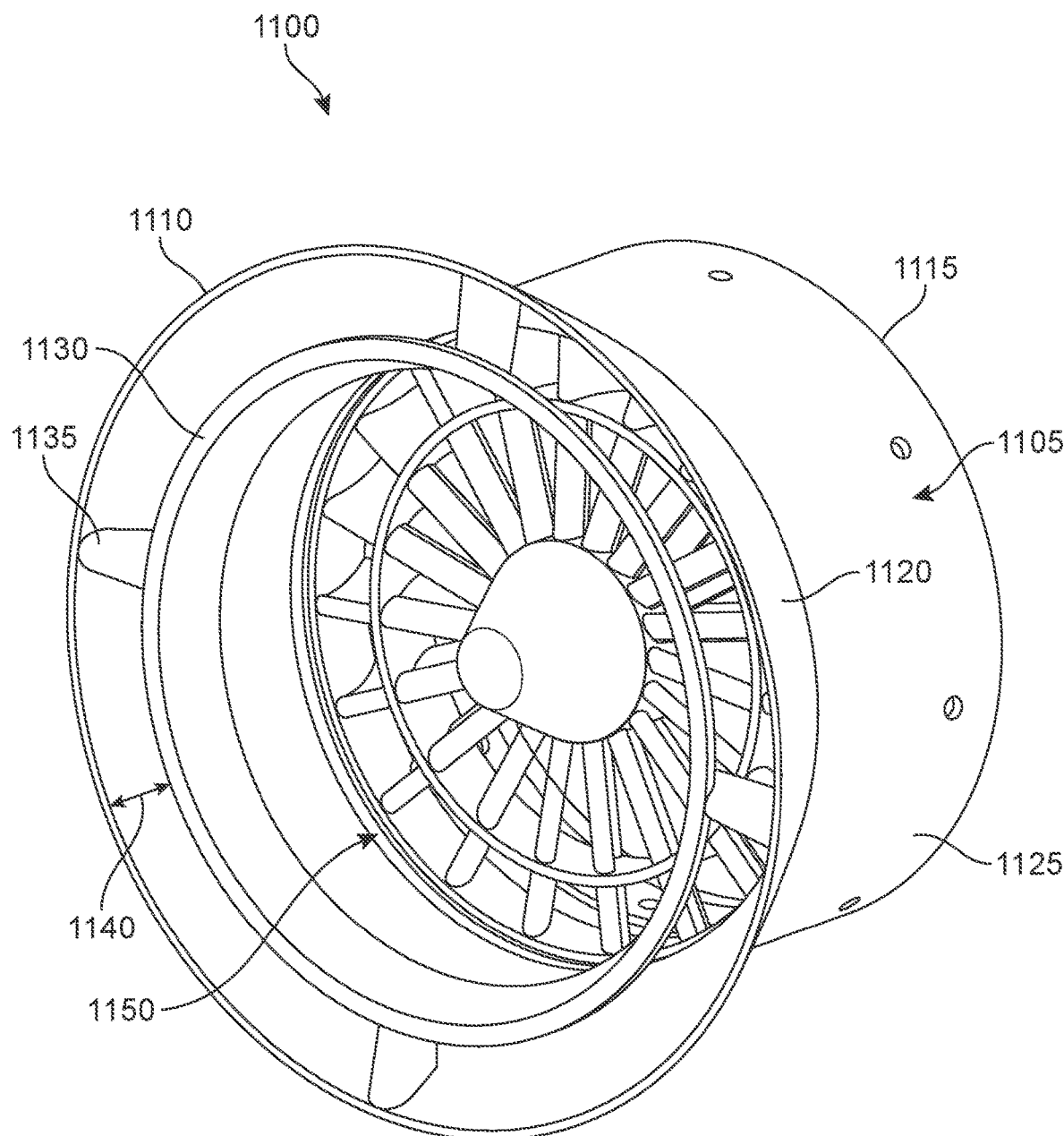
FIG. 11 is a schematic illustration of a front perspective view of a fluid accelerator according to an exemplary embodiment.

FIG. 11 is a schematic illustration of a front perspective view of a fluid accelerator according to an exemplary embodiment. As shown in FIG. 11, a fluid accelerator 1100 may include an outer housing 1105 having an inlet end 1110 and an outlet end 1115. When fluid flows from inlet end 1110 to outlet end 1115, the fluid is accelerated.

Outer housing 1105 may be formed of any suitable material, such as metals, plastics, composites, and or other construction materials. In addition, although outer housing 1105 is shown as having a circular cross-section, certain portions of outer housing 1105 may have a different cross-sectional shape.

Multiple fluid accelerating components may be disposed within outer housing 1105. For example, as shown in FIG. 11, fluid accelerator 1100 may include an annular ring 1130, which may have an airfoil cross-sectional shape. In addition, fluid accelerator 1100 may also include a turbine wheel 1150, including both turbine blades and compressor blades.

As shown in FIG. 11, outer housing 1105 may include an inlet portion 1120 and an outlet portion 1125. In some embodiments, outer housing 1105 may define a converging nozzle proximate inlet end 1110. For example, as shown in FIG. 11, inlet portion 1120 of outer housing 1105 may be a converging nozzle. That is, as shown in FIG. 11, inlet portion 1120 may be substantially conical, with a diameter that reduces along the direction of fluid flow. Within the converging nozzle of inlet portion 1120 of outer housing 1105, annular ring 1130 may be disposed proximate inlet end 1110.

As shown in FIG. 11, annular ring 1130 may be disposed proximate inlet end 1110 of outer housing 1105 within the converging nozzle of outer housing 1105. As also shown in FIG. 11, annular ring 1130 may be spaced from outer housing 1105 by a plurality of spacer mounts 1135, as indicated by an arrow 1140. Any suitable number of spacer mounts 1135 may be used to support annular ring 1130. For example, more flexible and/or delicate annular rings may require more spacer mounts, whereas more robust annular rings may be provided with fewer spacer mounts. The spacing between annular ring 1130 and outer housing 1105 indicated by arrow 1140 may be determined based on the use of fluid accelerator 1100. This spacing, along with other various parameters such as the shape of the airfoil, size of the airfoil, angle of the converging nozzle, etc., may be selected according to the intended use of the device. Factors for determining these parameters may include the type of fluid (e.g., air, gas, liquid, etc.), speed of fluid flow entering the fluid accelerator, desired speed of fluid flow exiting the fluid accelerator, size and fitment constraints, etc.

Figure 12:
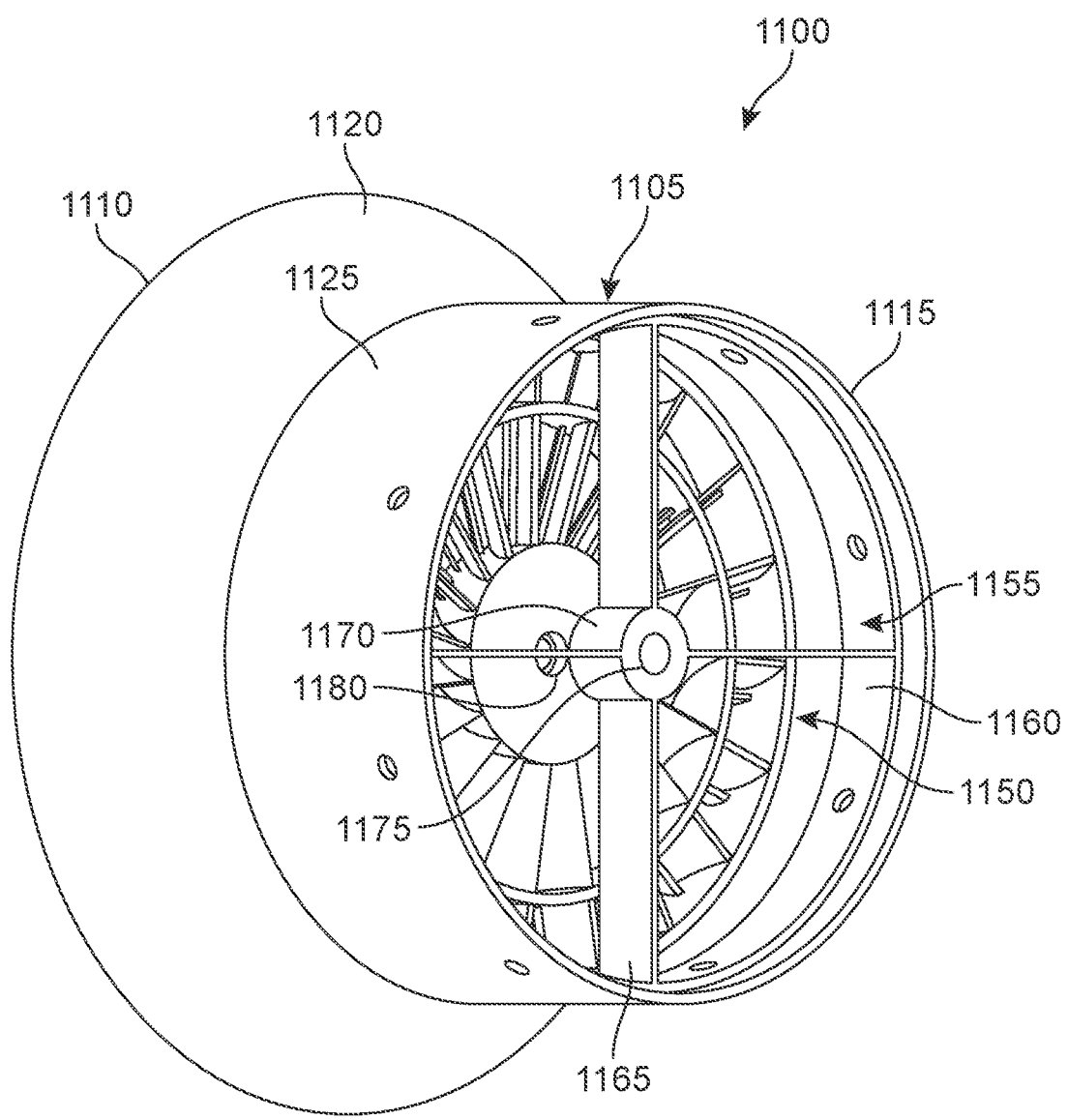
FIG. 12 is a schematic illustration of a rear perspective view of the fluid accelerator shown in FIG. 11.

FIG. 12 is a schematic illustration of a rear perspective view of the downstream end of the fluid accelerator shown in FIG. 11. As shown in FIG. 12, fluid accelerator 1100 may also include a mounting cross-member 1155 for turbine wheel 1150. As shown in FIG. 12, mounting cross-member 1155 may include a peripheral ring 1160, which may be mounted to outer housing 1105. In addition, mounting cross-member 1155 may have a central hub 1170, which is connected to peripheral ring 1160 by a plurality of supports 1165. Central hub 1170 may have a center hole 1175 configured to receive a connecting shaft 1300 (See FIG. 13.). Connecting shaft 1300 may be received within center hole 1175 and a center opening 1180 of turbine wheel 1150 in order to mount turbine wheel 1150 within outer housing 1105. As mounted, turbine wheel 1150 is free to rotate within outer housing 1105, while mounting cross-member 1155 is fixed with respect to outer housing 1105.

Figure 13:
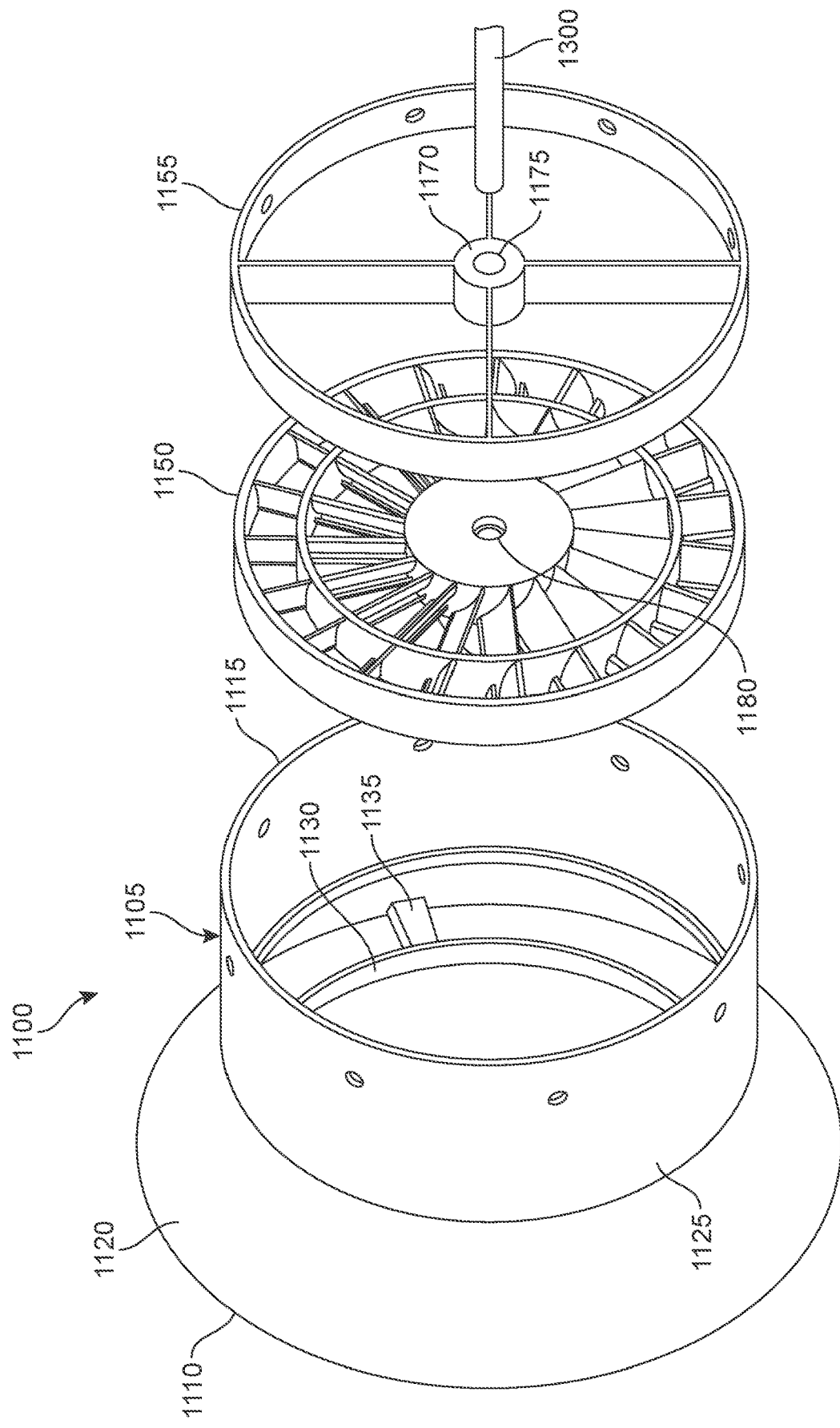
FIG. 13 is a schematic illustration of a rear perspective exploded view of the fluid accelerator shown in FIG. 11.

FIG. 13 is a schematic illustration of a rear perspective exploded view of the fluid accelerator shown in FIG. 11. As shown in FIG. 13, a connecting shaft 1300 may be used to mount turbine wheel 1150 to mounting cross-brace 1155. Connecting shaft 1300 is illustrated generically in FIG. 13. It will be understood that connecting shaft 1300 may have any configuration suitable to rotatably connect turbine wheel 1150 with mounting cross-brace 1155. In order to permit turbine wheel 1150 to rotate with respect to mounting cross-brace 1155, one or more bushings, bearings, or other rotatable connecting devices may be provided in center opening 1180 of turbine wheel 1150, in center hole 1175 of mounting cross-brace 1155, at the upstream end of connecting shaft 1300, and/or at the downstream end of connecting shaft 1300.

Annular ring 1420 may have any suitable airfoil shape wherein the suction side faces generally radially outward and is tilted downstream, and the pressure side is facing radially inward and is tiled upstream. In some embodiments, annular ring 1420 may have an airfoil shape configured as described above with respect to FIGS. 1-5. That is, annular ring 1420 may have a hooked cross-sectional shape.

Figure 14:
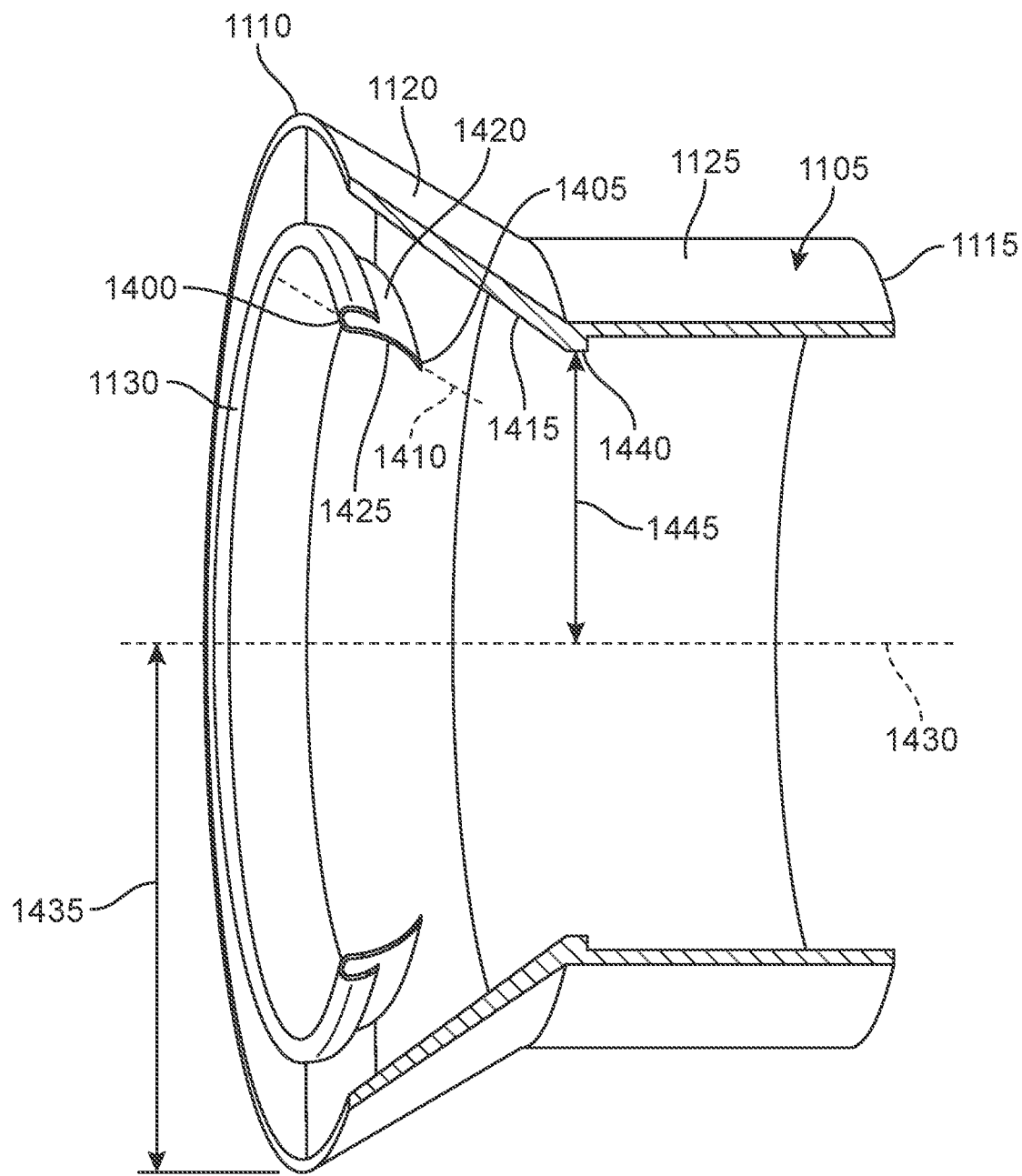
FIG. 14 is a schematic illustration of a perspective cut-away cross-sectional view of a nozzle of the fluid accelerator shown in FIG. 11.

FIG. 14 is a schematic illustration of a perspective cut-away cross-sectional view of a nozzle of the fluid accelerator shown in FIG. 11. As shown in FIG. 14, annular ring 1130 has a leading edge 1400 and a trailing edge 1405. In addition, annular ring 1130 has a suction side 1420 of the airfoil cross-sectional shape and a pressure side 1425 of the airfoil cross-sectional shape. As further shown in FIG. 14, annular ring 1130 may be angled with suction side 1420 of the airfoil cross-sectional shape being tilted downstream toward outlet end 1115 of outer housing 1105 and with pressure side 1125 of the airfoil cross-sectional shape being tilted upstream toward inlet end 1110 of outer housing 1105.

In some embodiments, a line extending through the leading edge and the trailing edge of the annular ring may be substantially parallel to the inner surface of the converging nozzle proximate the inlet end of the outer housing. For example, the tilting of annular ring 1130 is illustrated in FIG. 14 by airfoil axis 1410 extending through leading edge 1400 and trailing edge 1405 of annular ring 1130. Notably, airfoil axis 1410 is angled with respect to central axis 1430 extending through outer housing 1105. As shown in FIG. 14, in some embodiments, airfoil axis 1410 may be substantially parallel to an inner surface 1415 of the converging nozzle formed by inlet portion 1120 of outer housing 1105.

Also, for reference, FIG. 14 illustrates that, at inlet end 1110, outer housing 1105 has a first radius 1435, and in a neck region 1440 between inlet portion 1120 and outlet portion 1125, outer housing 1105 may have a second radius 1445 that is less than first radius 1435. Thus, inlet portion 1120 forms a converging nozzle.

In addition to an annular ring having an airfoil cross-sectional shape, the fluid accelerator may include a turbine wheel disposed within the outer housing downstream from the annular ring. The turbine wheel may include a plurality of turbine blades oriented to be driven by a fluid stream flowing through the turbine wheel to rotate the turbine wheel in a first direction about the central axis. In addition, the turbine wheel may include a plurality of compressor blades oriented to propel a fluid in a downstream direction when the turbine wheel is rotated in the first direction. In order to produce this effect, the turbine blades are positioned radially outward of the compressor blades. This way, the torque produced by the turbine blades is higher because the turbine blades are disposed further away from the central axis of the turbine wheel. The larger moment arm of the longer radius produces higher torque.

Figure 15:
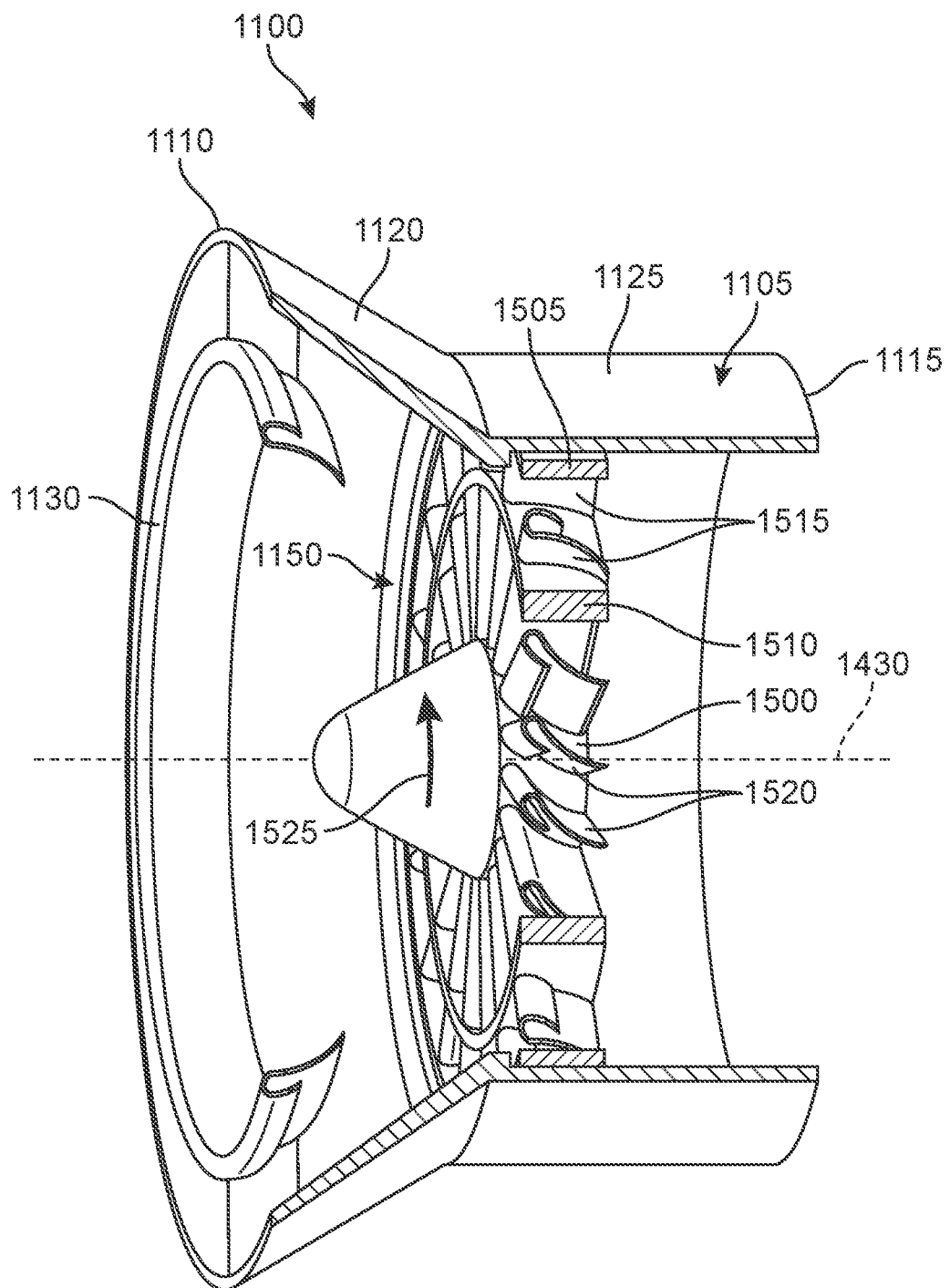
FIG. 15 is a schematic illustration of a perspective cut-away cross-sectional view of a nozzle and turbine wheel of the fluid accelerator shown in FIG. 11.

FIG. 15 is a schematic illustration of a perspective cutaway cross-sectional view of a nozzle and turbine wheel of the fluid accelerator shown in FIG. 11. As shown in FIG. 15, turbine wheel 1150 may be disposed within outer housing 1105 downstream from annular ring 1130. Turbine wheel 1150 may include an inner hub 1500 having a central axis 1430, an outer ring 1505 concentric with inner hub 1500, and an intermediate ring 1510 concentrically disposed between inner hub 1500 and outer ring 1505. In addition, turbine wheel 1150 may include a plurality of turbine blades 1515 extending between intermediate ring 1510 and outer ring 1505. Turbine blades 1515 may be oriented to be driven by a fluid stream through turbine wheel 1150 to rotate turbine wheel 1150 in a first direction about central axis 1430, as indicated by an arrow 1525. In the embodiments illustrated herein, turbine wheel 1150 is configured to be driven in a counter-clockwise direction (when viewed from the upstream side of the turbine wheel) by turbine blades 1515, as indicated by arrow 1525. However, it will be understood that, in other embodiments, the turbine wheel may be configured to be driven in a clockwise direction. The orientation of the turbine blades may simply be reversed to drive the turbine wheel in the clockwise direction.

As shown in FIG. 15, turbine wheel 1150 may also include a plurality of compressor blades 1520 extending between inner hub 1500 and intermediate ring 1510. Compressor blades 1520 may be oriented to drive a fluid downstream when turbine wheel 1150 is rotated in the first direction (arrow 1525) by turbine blades 1515.

Figure 16:
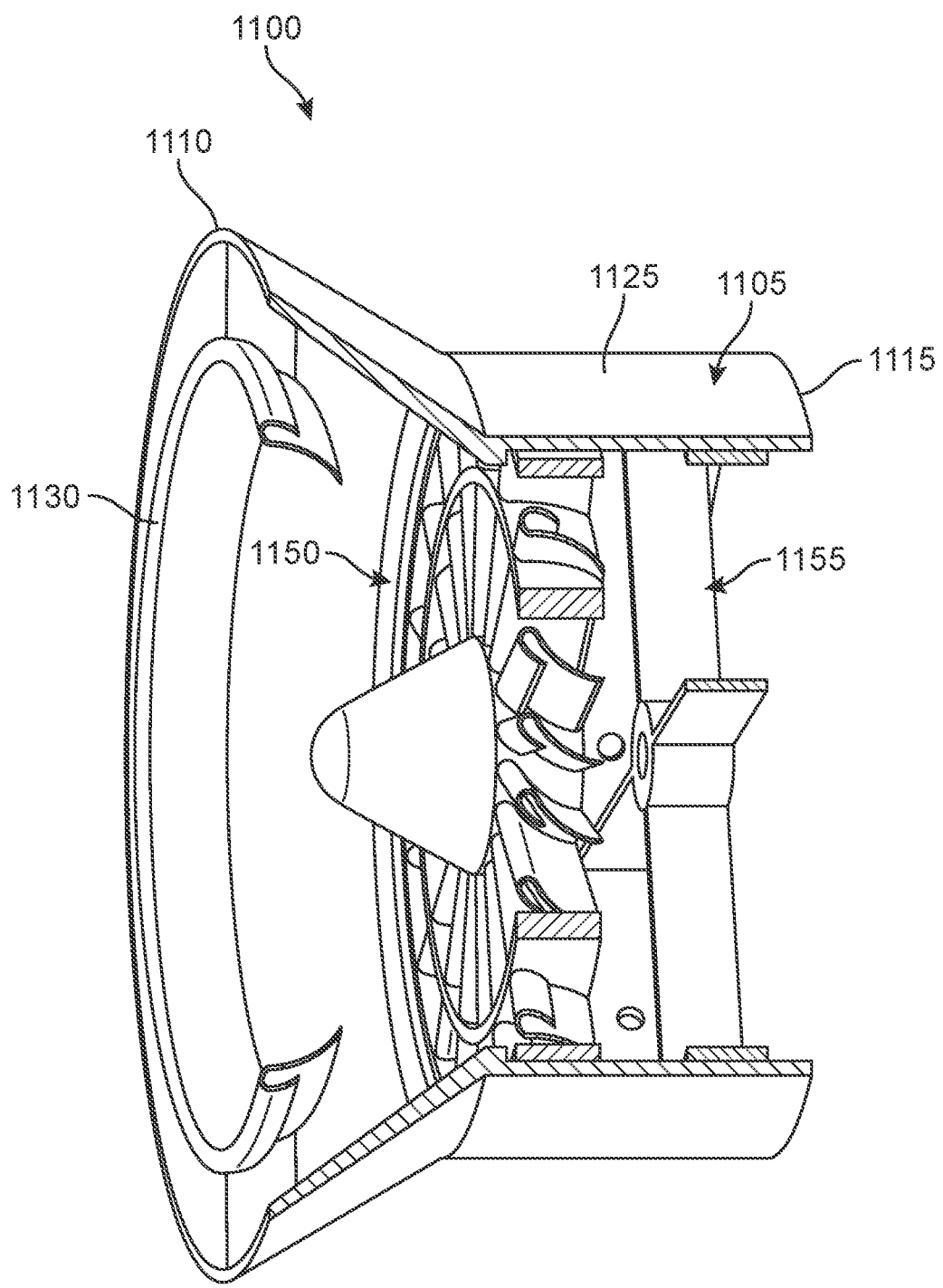
FIG. 16 is a schematic illustration of a perspective cut-away cross-sectional view of the fluid accelerator shown in FIG. 11.

FIG. 16 is a schematic illustration of a perspective cutaway cross-sectional view of fluid accelerator 1100. FIG. 16 illustrates fluid accelerator 1100 with mounting cross-brace 1155 disposed within outer housing 1105. FIG. 16 does not illustrate fasteners that would be utilized to attach mounting cross-brace 1155 to outer housing 1105. It will be understood that any suitable type of fasteners, such as bolts, rivets, etc., may be used to fixedly attach or removably attach mounting cross-brace 1155 to outer housing 1105. In addition, the connecting shaft between turbine wheel 1150 and mounting cross-brace 1155 is also omitted from FIG. 16. It will be understood that, as discussed above, a connecting shaft will be used to mount turbine wheel 1150 to mounting cross-brace 1155 within outer housing 1105. (See also FIG. 13.)

Figure 17:
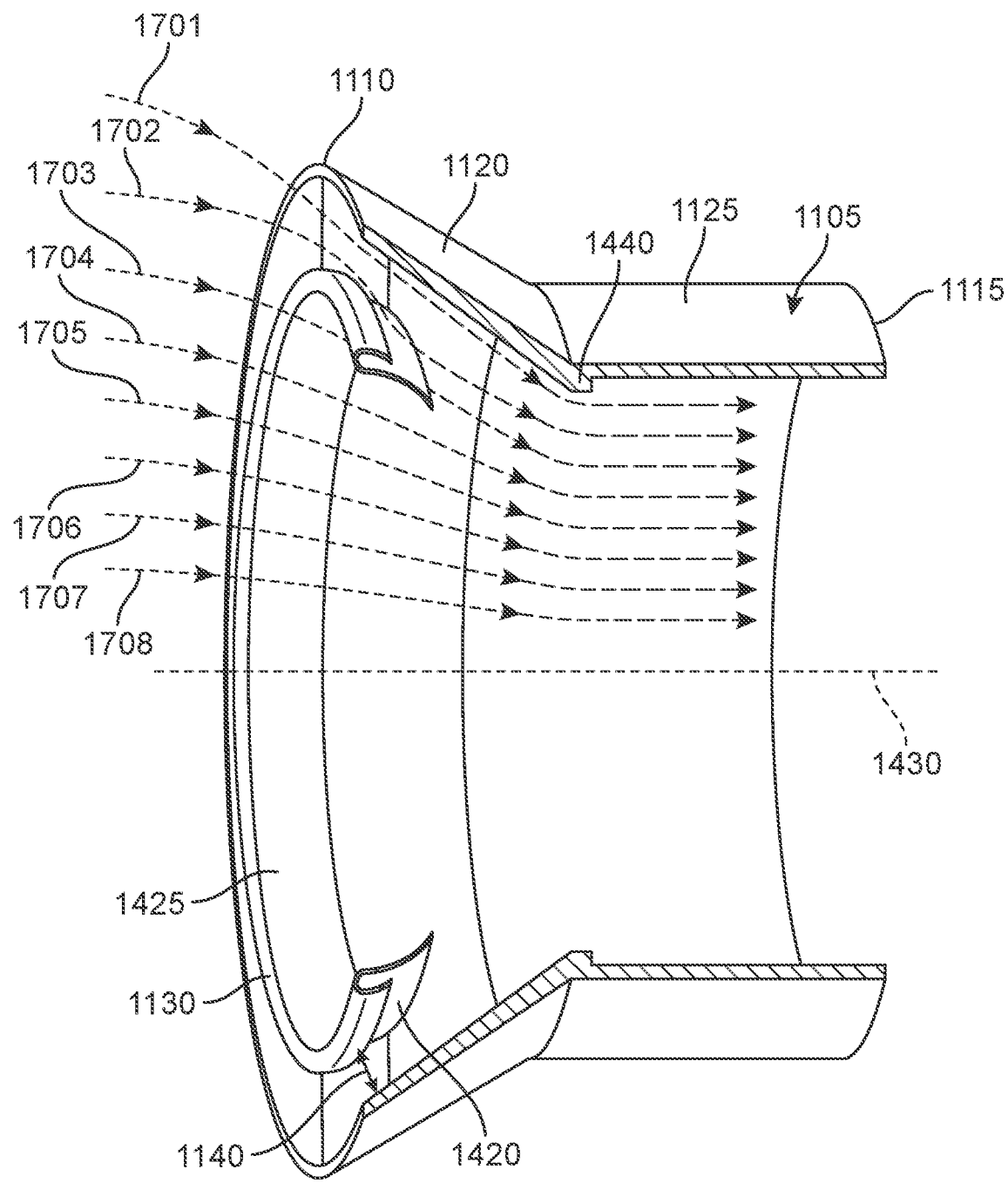
FIG. 17 is a schematic illustration of a perspective cut-away cross-sectional view of the outer housing and annular ring of the fluid accelerator shown in FIG. 11 shown with fluid flow patterns effectuated by the outer housing and annular ring.

FIG. 17 is a schematic illustration of a perspective cutaway cross-sectional view of outer housing 1105 and annular ring 1130 of fluid accelerator 1100 shown with fluid flow patterns effectuated by outer housing 1105 and annular ring 1130. There are several ways in which outer housing 1105 and annular ring 1130 accelerate fluid flow through the fluid accelerator.

The airfoil shape of annular ring 1130 accelerates the air flowing over suction side 1420. This results in a reduction in pressure proximate to suction side 1420 of annular ring 1130, which produces several effects. In particular, this reduction in pressure on suction side 1420 of annular ring 1130 draws fluid into this area of reduced pressure from several places.

First, this reduced pressure draws fluid from beyond the radius of inlet end 1110 of outer housing 1105. This is illustrated by a first flow line 1701. As shown in FIG. 17, first flow line begins at a larger radius than inlet end 1110. Absent the reduced pressure on suction side 1420 of annular ring 1130, the fluid at the beginning of first flow line 1701 would simply bypass around the outer edge of inlet end 1110. However, this reduced pressure draws this fluid from this circumferential area outside the radius of inlet end 1110. Thus, a greater amount of fluid is essentially funneled through inlet end 1110 than would be if annular ring 1130 were not disposed within outer housing 1105. By forcing more fluid through a given size opening, the fluid is accelerated. This is illustrated by the increased length of the dashes of first fluid flow line 1701 as it enters outer housing 1105.

Second, this reduced pressure on suction side 1420 of annular ring 1130 is located in the area between annular ring 1130 and inlet end 1110 of outer housing 1105. Accordingly, as illustrated in FIG. 17 by a second fluid flow line 1702, fluid flowing directly into the space 1140 between annular ring 1130 and inlet end 1110 of outer housing 1105 is accelerated. The increased speed of the fluid is illustrated by the increased length of the dashes of second fluid flow line 1702 as it passes over suction side 1420 of annular ring 1130.

In addition, because of the tilting of annular ring 1130, pressure side 1425 of annular ring 1130 forms a converging nozzle. Accordingly, fluid flowing proximate pressure surface 1425 of annular ring 1130 is accelerated. This is illustrated by a third fluid flow line 1703. As shown in FIG. 17, the dashes of third fluid flow line 1703 get longer as the fluid passes over pressure side 1425 and converges. The effects of this converging nozzle formed by the tilted pressure side 1425 of annular ring 1130 diminish the further the fluid flow is spaced radially inward from annular ring 1130. For example, a fourth fluid flow line 1704 illustrates an increase in speed, but the length of the dashes do not increase to the same extent as those of third fluid flow line 1703. Fifth fluid flow line 1705, shows less acceleration than fourth fluid flow line 1704. A sixth fluid flow line 1706 and a seventh fluid flow line 1707 show progressively less acceleration. In addition, an eighth fluid flow line 1708, which is proximate central axis 1430 of outer housing 1105, shows the least acceleration.

In addition to the fluid acceleration provided by suction side 1420 of annular ring 1130 and by the converging nozzle effect of angled pressure side 1425 of annular ring 1130, additional acceleration is also provided by the converging nozzle configuration of inlet portion 1120 of outer housing 1105. Accordingly, the fluid flow lines downstream of annular ring 1130 show further acceleration, which also diminishes with distance radially inward from outer housing 1105. Accordingly, this combination of a converging nozzle of outer housing 1105 and a tilted airfoil shape of annular ring 1130 produces a significant amount of fluid acceleration, the greatest of which is in the radially outwardmost portion of the fluid flow cavity.

The fluid acceleration provided by the converging nozzle of outer housing 1105 in combination with annular ring 1130 being the greatest in the radially outwardmost region is beneficial when this system is further combined with turbine wheel 1150, since it is the turbine blades that are positioned radially outward and driven by the fluid flow that has been pre-accelerated by the converging nozzle of outer housing 1105 and annular ring 1130.

Figure 18:
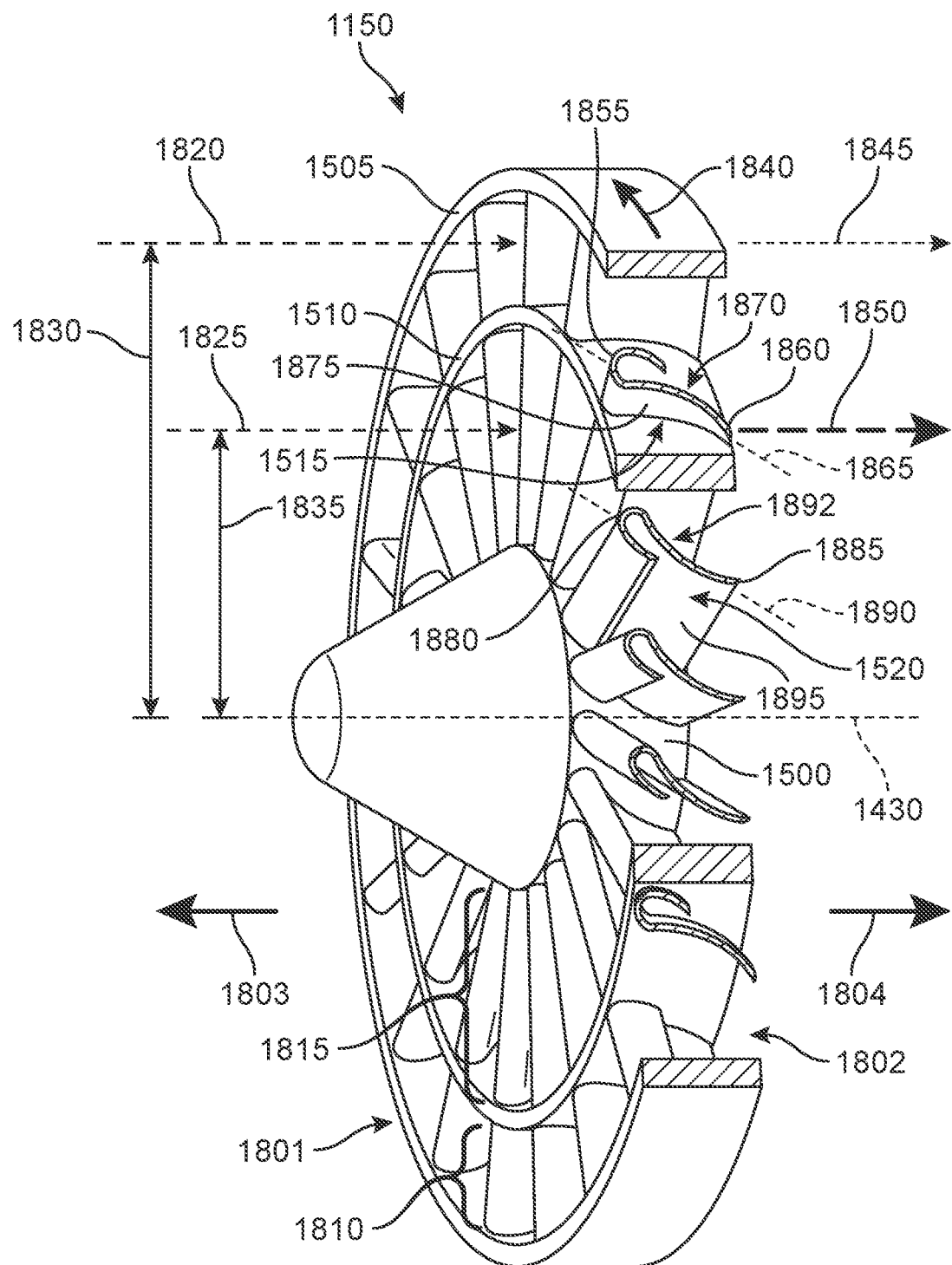
FIG. 18 is a schematic illustration of a cutaway cross-sectional view of the turbine wheel of the fluid accelerator shown in FIG. 11.

FIG. 18 is a schematic illustration of a cutaway cross-sectional view of turbine wheel 1150. FIG. 18 illustrates exemplary orientations of turbine blades 1515 and compressor blades 1520. In addition, FIG. 18 also illustrates the effect that turbine wheel 1150 has on fluid flowing through turbine blades 1515 and compressor blades 1520.

As shown in FIG. 18, turbine wheel 1150 has an inlet side 1801 and an outlet side 1802. Accordingly, FIG. 18 illustrates an upstream direction 1803 and a downstream direction 1804.

Turbine blades 1515 may have any suitable airfoil shape. In some embodiments, turbine blades 1515 may have an airfoil shape configured as described above with respect to FIGS. 1-5. That is, turbine blades 1515 may have a hooked cross-sectional shape, as shown in FIG. 18.

As shown in FIG. 18, turbine blades 1515 may be angled with a suction side 1870 of the airfoil cross-sectional shape being tilted downstream toward outlet side 1802 of turbine wheel 1150 and a pressure side 1875 of the airfoil cross-sectional shape being tilted upstream toward inlet side 1801 of turbine wheel 1150. For example, as shown in FIG. 18, turbine blades 1515 may each have a leading edge 1855 and a trailing edge 1860. An axis 1865 through leading edge 1855 and trailing edge 1860 defines a line, which illustrates the tilt angle of turbine blades 1515.

Compressor blades 1520 may have any suitable airfoil shape. In some embodiments, compressor blades 1520 may have an airfoil shape configured as described above with respect to FIGS. 1-5. That is, compressor blades 1520 may have a hooked cross-sectional shape, as shown in FIG. 18.

As shown in FIG. 18, compressor blades 1520 may be angled with a pressure side 1892 of the airfoil cross-sectional shape being tilted downstream toward outlet side 1802 of turbine wheel 1150 and a suction side 1895 of the airfoil cross-sectional shape being tilted upstream toward inlet side 1801 of turbine wheel 1150. For example, as shown in FIG. 18, compressor blades 1520 may each have a leading edge 1880 and a trailing edge 1885. An axis 1890 through leading edge 1880 and trailing edge 1885 defines a line, which illustrates the tilt angle of compressor blades 1520.

The turbine blades and compressor blades may be angled as described above at any suitable angles. In some embodiments, the turbine blades and the compressor blades may be angled such that a line extending through a leading edge and a trailing edge of a turbine blade is parallel to a line extending through a leading edge and a trailing edge of a compressor blade located radially inward from the turbine blade.

FIG. 18 illustrates the effect of turbine wheel 1150 on the flow of fluid through different regions of turbine wheel 1150. As shown in FIG. 18, an annular outer region 1810 is defined between outer ring 1505 and intermediate ring 1510. Fluid flow through outer region 1810 of turbine wheel 1150 passes through turbine blades 1515. In addition, an annular inner region 1815 is defined between intermediate ring 1510 and inner hub 1500. Fluid flow through inner region 1815 of turbine wheel 1150 passes through compressor blades 1520.

More particularly, fluid flow introduced through outer region 1810 is represented by an arrow 1820. This fluid flowing through outer region 1810 around turbine blades 1515 drives turbine wheel 1150 in a counter-clockwise direction 1840. By converting the energy from the fluid flow to rotational movement of turbine wheel 1150, the speed of the fluid flow coming out the outlet side 1802 of outer region 1810 is slower than at inlet side 1801 of outer region 1810, as illustrated by a smaller arrow 1845.

Fluid flow introduced through inner region 1815 is represented by an arrow 1825. Because of the orientation of compressor blades 1520, this fluid flow is pulled through inner region 1815 by compressor blades 1520, and thus, propelled in downstream direction 1804 from outlet side 1802 of inner region 1815. A larger arrow 1850 illustrates the increased speed of fluid flow exiting inner region 1815 as compared to smaller arrow 1825 indicating the air entering inner region 1815.

Thus, fluid flowing through outer region 1810 and inner region 1815 at the same speed will result in the fluid coming out of outer region 1810 being slower and the fluid coming out of inner region 1815 being faster. As shown in FIG. 18, arrow 1820, representing fluid flow through outer region 1810, is flowing at an outer radius 1830 from central axis 1430, whereas arrow 1825, representing fluid flow through inner region 1815, is flowing at an inner radius 1835, which is smaller than outer radius 1830. Because turbine blades 1515 are located radially further from central axis 1430 of turbine wheel 1150 than compressor blades 1520, the fluid flowing through outer region 1810 generates a larger amount of torque than required to propel the fluid through inner region 1815. This results in an overall acceleration of the total flow of air through turbine wheel 1150.

Accordingly, turbine wheel 1150, if placed in a fluid stream, will accelerate the fluid stream. When combined with the outer housing and airfoil-shaped annular ring of fluid accelerator 1100, the fluid stream is greater. As discussed above with respect to FIG. 17, the fluid flow in the radially outer areas is accelerated the most by the outer housing and annular ring. Accordingly, this fluid in the radially outer areas has even greater energy to drive turbine blades 1515 of turbine wheel 1150, which results in greater propulsion of fluid through inner region 1815.

These three fluid accelerating components (i.e., 1. an outer housing with a converging nozzle, 2. an airfoil-shaped annular ring within the outer housing, and 3. a turbine wheel as described above), each provide fluid acceleration individually, and provide greater fluid acceleration when combined with one another. Further, these fluid accelerating components may be implemented to accelerate fluids in a variety of environments. Above, an exemplary use at an inlet to a ram air turbine is discussed. Another exemplary use for such a fluid accelerator is at the inlet of a jet engine.

Figure 19:
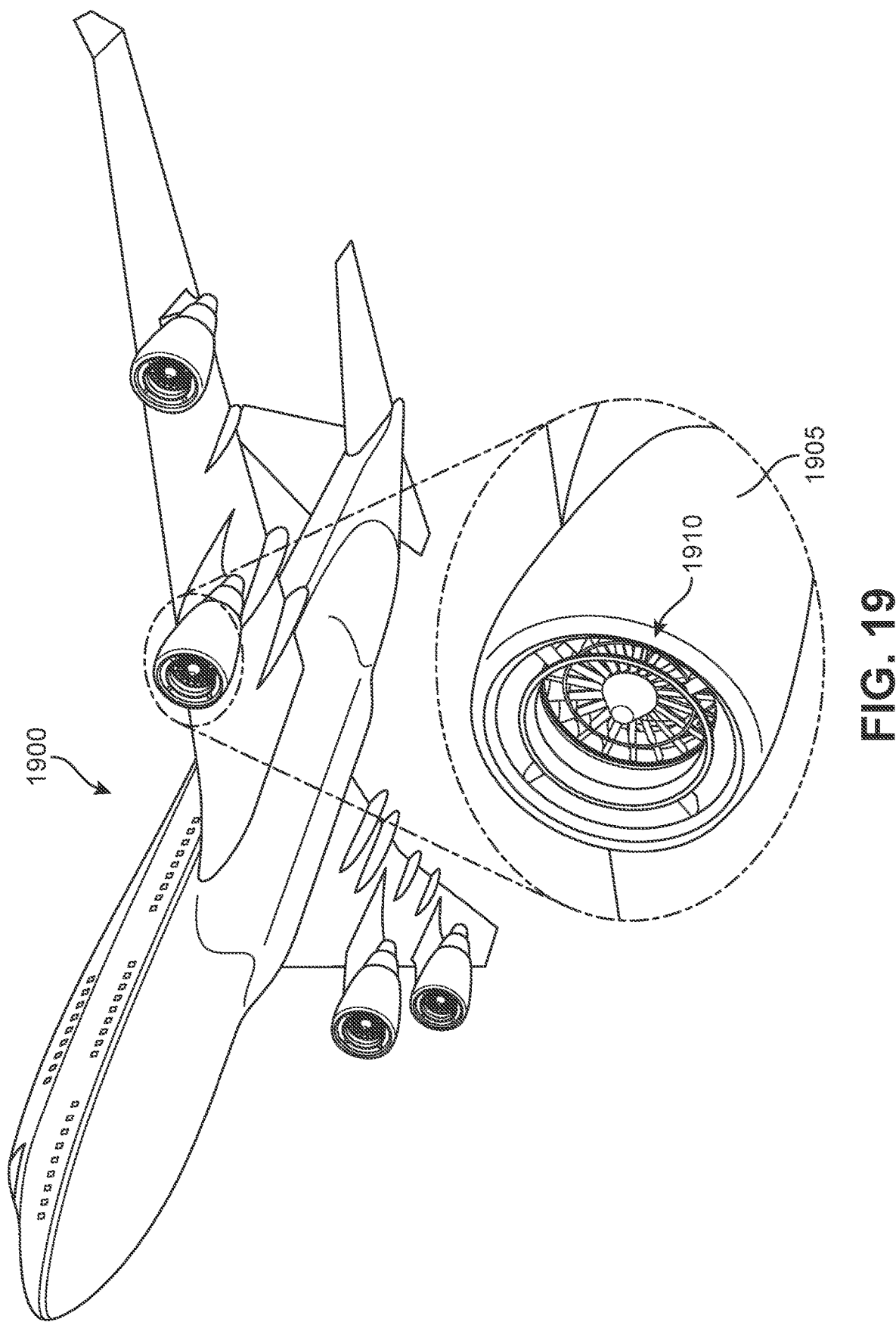
FIG. 19 is a schematic illustration of an airplane having a fluid accelerator mounted at the inlet of its turbine engines.

FIG. 19 is a schematic illustration of an airplane having fluid accelerators mounted at the inlets of its turbine engines. As shown in FIG. 19, an airplane 1900 may include one or more jet engines 1905. The inlet of one or more of such jet engines may include a fluid accelerator 1910, which may have the same or similar configuration as fluid accelerator 1100 discussed above. Such an implementation of a fluid accelerator may pre-accelerate air entering the jet engines, enabling the engines to generate more thrust.

While various embodiments of the invention have been described, the description is intended to be exemplary, rather than limiting, and it will be apparent to those of ordinary skill in the art that many more embodiments and implementations are possible that are within the scope of the invention. Any element of any embodiment may be substituted for another element of any other embodiment or added to another embodiment except where specifically excluded. Accordingly, the invention is not to be restricted except in light of the attached claims and their equivalents. Also, various modifications and changes may be made within the scope of the attached claims.

The invention claimed is:

1. A turbine wheel, comprising:
an inner hub having a central axis, an outer ring concentric with the inner hub, and an intermediate ring concentrically disposed between the inner hub and the outer ring,
a plurality of turbine blades extending between the intermediate ring and the outer ring;

the turbine blades being oriented to be driven by a stream of fluid flowing through the turbine wheel to rotate the turbine wheel in a first direction about the central axis; and a plurality of compressor blades extending between the inner hub and the intermediate ring, each compressor blade including a leading edge and a trailing edge;

the compressor blades being oriented to propel the stream of fluid in a direction downstream of the trailing edges of the compressor blades and axially with respect to the central axis when the turbine wheel is rotated in the first direction.

2. The turbine wheel of claim 1, wherein the turbine wheel has an inlet side and an outlet side;

wherein the turbine blades have an airfoil cross-sectional shape including a suction side and a pressure side; and wherein the turbine blades are angled with the suction side of the airfoil cross-sectional shape being tilted downstream toward the outlet side of the turbine wheel and the pressure side of the airfoil cross-sectional shape being tilted upstream toward the inlet side of the turbine wheel.

3. The turbine wheel of claim 2, wherein the compressor blades have an airfoil cross-sectional shape including a suction side and a pressure side; and wherein the compressor blades are angled with the pressure side of the airfoil cross-sectional shape being tilted downstream toward the outlet side of the turbine wheel and the suction side of the airfoil cross-sectional shape being tilted upstream toward the inlet side of the turbine wheel.

4. The turbine wheel of claim 3, wherein the turbine blades and the compressor blades are angled such that a line extending through a leading edge and a trailing edge of a turbine blade is parallel to a line extending through a leading edge and a trailing edge of a compressor blade located radially inward from the turbine blade.

5. The turbine wheel of claim 1, wherein one or more of the turbine blades has a leading edge, a trailing edge, a suction side, a pressure side, and an airfoil cross-sectional shape including:

a base portion including a first surface associated with the pressure side and a second surface associated with the suction side;

an overhang portion that extends over at least a portion of the base portion;

an elliptic portion connecting the base portion and the overhang portion adjacent the leading edge; and wherein the overhang portion is curved toward the second surface of the base portion.

6. The turbine wheel of claim 5, wherein the overhang portion comprises a first arc portion having a first radius of curvature on the suction side, the overhang portion further comprising a second arc portion having a second radius of curvature on the suction side that is different from the first radius of curvature.

7. The turbine wheel of claim 6, wherein the second radius of curvature is greater than the first radius of curvature.

8. The turbine wheel of claim 5, wherein a free end of the overhang portion is separated from the base portion by a gap, and wherein the gap is greater than a local thickness of the overhang portion.

9. A turbine wheel, comprising:

a plurality of turbine blades oriented to be driven by a stream of fluid flowing through the turbine wheel to rotate the turbine wheel in a first direction about a central axis of the turbine wheel; and a plurality of compressor blades oriented to propel the fluid in a downstream direction when the turbine wheel is rotated in the first direction;

wherein the turbine blades and/or the compressor blades have an airfoil cross-sectional shape, including:

a base portion including a first surface associated with a pressure side and a second surface associated with a suction side;

an overhang portion that extends over at least a portion of the base portion; and an elliptic portion connecting the base portion and the overhang portion adjacent a leading edge;

wherein the overhang portion is curved toward the second surface of the base portion.

10. The turbine wheel of claim 9, wherein the overhang portion comprises a first arc portion having a first radius of curvature on the suction side, the overhang portion further comprising a second arc portion having a second radius of curvature on the suction side that is different from the first radius of curvature.

11. The turbine wheel of claim 10, wherein the second radius of curvature is greater than the first radius of curvature.

12. The turbine wheel of claim 9, wherein a free end of the overhang portion is separated from the base portion by a gap, and wherein the gap is greater than a local thickness of the overhang portion.

13. The turbine wheel of claim 12, wherein the gap is at least twice as large as the local thickness of the overhang portion.

14. A fluid accelerator, comprising:

an outer housing having an inlet end and an outlet end, the outer housing defining a nozzle proximate the inlet end; and an annular ring disposed proximate the inlet end of the outer housing within the nozzle;

wherein the annular ring has an airfoil cross-sectional shape;

a turbine wheel disposed within the outer housing downstream from the annular ring, the turbine wheel including:

an inner hub having a central axis, an outer ring concentric with the inner hub, and an intermediate ring concentrically disposed between the inner hub and the outer ring, a plurality of turbine blades extending between the intermediate ring and the outer ring;

the turbine blades being oriented to be driven by a stream of fluid through the turbine wheel to rotate the turbine wheel in a first direction about the central axis; and a plurality of compressor blades extending between the inner hub and the intermediate ring;

the compressor blades being oriented to drive the fluid downstream when the turbine wheel is rotated in the first direction.

15. The fluid accelerator of claim 14, wherein the nozzle is a converging nozzle.

16. The fluid accelerator of claim 14, wherein one or more of the turbine blades and/or one or more of the compressor blades each have a leading edge, a trailing edge, a suction side, a pressure side, and an airfoil cross-sectional shape including:

a base portion including a first surface associated with the pressure side and a second surface associated with the suction side;

an overhang portion that extends over at least a portion of the base portion;

an elliptic portion connecting the base portion and the overhang portion adjacent the leading edge; and wherein the overhang portion is curved toward the second surface of the base portion.

17. The fluid accelerator of claim 16, wherein the overhang portion comprises a first arc portion having a first radius of curvature on the suction side, the overhang portion further comprising a second arc portion having a second radius of curvature on the suction side that is different from the first radius of curvature.

18. The fluid accelerator of claim 17, wherein the second radius of curvature is greater than the first radius of curvature.

19. The fluid accelerator of claim 16, wherein a free end of the overhang portion is separated from the base portion by a gap, and wherein the gap is greater than a local thickness of the overhang portion.

20. The fluid accelerator of claim 19, wherein the gap is at least twice as large as the local thickness of the overhang portion.

* * * * *